US010427382B2

United States Patent
Aldousari et al.

(10) Patent No.: US 10,427,382 B2
(45) Date of Patent: Oct. 1, 2019

(54) COMPOSITE EPOXY MATERIAL WITH EMBEDDED MWCNT FIBERS AND PROCESS OF MANUFACTURING

(71) Applicant: King Abdulaziz University, Jeddah (SA)

(72) Inventors: Saad M. Aldousari, Jeddah (SA); Usama A. Khashaba, Jeddah (SA); Mostafa A. Hamed, Jeddah (SA); Hassan S. Hedia, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 15/197,115

(22) Filed: Jun. 29, 2016

(65) Prior Publication Data
US 2017/0120563 A1 May 4, 2017

Related U.S. Application Data

(60) Provisional application No. 62/247,980, filed on Oct. 29, 2015.

(51) Int. Cl.
*B32B 17/04* (2006.01)
*B32B 5/28* (2006.01)
(Continued)

(52) U.S. Cl.
CPC ............ *B32B 17/067* (2013.01); *B29C 39/00* (2013.01); *B29C 70/00* (2013.01); *B32B 5/26* (2013.01);
(Continued)

(58) Field of Classification Search
CPC .............. C08J 5/005; Y10T 428/24994; Y10T 428/249942–428/249946;
(Continued)

(56) References Cited

U.S. PATENT DOCUMENTS 5,128,199 A * 7/1992 Iyer ........................... B05C 9/14
428/112
2003/0096104 A1* 5/2003 Tobita .................... B82Y 30/00
428/332
(Continued)

FOREIGN PATENT DOCUMENTS

CN 102276795 A 12/2011
CN 102617984 A 8/2012
EP 2368932 B1 1/2014

OTHER PUBLICATIONS

Alnefaie et al., "New development of self-damping MWCNT composites," Composites: Part A, vol. 52, 2013, p. 1-11.*
(Continued)

*Primary Examiner* — Z. Jim Yang
(74) *Attorney, Agent, or Firm* — Oblon, McClelland, Maier & Neustadt, L.L.P.

(57) ABSTRACT

A stacked composite material having at least one glass fiber layer, at least two nanocomposite layers comprising multi walled carbon nanotubes dispersed in an epoxy matrix. Each glass fiber layer is sandwiched between two nanocomposite layers and the glass fiber layers are oriented in a unidirectional or a quasi-isotropic orientation with respect to adjacent and non-contiguous glass fiber layers in the stacked composite material. A method of preparing a stacked composite material comprising applying a nanocomposite layer onto a mold, overlaying a glass fiber layer on top of the nanocomposite layer, rolling an aluminum roller over the glass fiber layer, repeating the applying, overlaying, and rolling to form a stacked composite material.

20 Claims, 14 Drawing Sheets

(51) Int. Cl.
  *B32B 5/26*    (2006.01)
  *B32B 17/06*   (2006.01)
  *B32B 37/10*   (2006.01)
  *C08J 5/00*    (2006.01)
  *B29C 39/00*   (2006.01)
  *B29C 70/00*   (2006.01)
  *B32B 38/00*   (2006.01)

(52) U.S. Cl.
  CPC ........... *B32B 5/28* (2013.01); *B32B 37/10* (2013.01); *C08J 5/005* (2013.01); *B32B 2038/0076* (2013.01); *B32B 2262/10* (2013.01); *B32B 2262/101* (2013.01); *B32B 2307/54* (2013.01); *B32B 2307/72* (2013.01); *B32B 2309/02* (2013.01); *B32B 2363/00* (2013.01)

(58) Field of Classification Search
  CPC ... Y10T 428/249948; Y10T 428/24995; Y10T 428/249952; B32B 5/26; B32B 5/28; B32B 17/02; B32B 17/04; B32B 17/067; B29C 70/02; B29C 70/021; B29C 70/025; B29C 70/06; B29C 70/10; B29C 70/16; B29C 70/20–70/24
  See application file for complete search history.

(56) References Cited

U.S. PATENT DOCUMENTS

| | | | | |
|---|---|---|---|---|
| 2008/0286564 A1* | 11/2008 | Tsotsis | ............... | B29C 70/025 428/332 |
| 2009/0117363 A1* | 5/2009 | Wardle | ............... | B29C 66/721 428/223 |
| 2011/0024694 A1* | 2/2011 | Shah | ............... | C08J 5/042 252/502 |
| 2011/0064908 A1* | 3/2011 | Kweder | ............... | B29B 11/16 428/113 |
| 2011/0174522 A1* | 7/2011 | Simmons | ............... | B32B 5/26 174/122 R |
| 2012/0177872 A1* | 7/2012 | Tsai | ............... | B29C 70/202 428/113 |
| 2013/0029089 A1* | 1/2013 | Kia | ............... | B29C 70/025 428/119 |
| 2013/0034447 A1* | 2/2013 | Nordin | ............... | B29C 70/081 416/230 |
| 2013/0034724 A1* | 2/2013 | Sodano | ............... | B32B 7/04 428/325 |
| 2013/0200309 A1* | 8/2013 | Song | ............... | B29C 70/025 252/502 |
| 2014/0023513 A1* | 1/2014 | Johnson | ............... | F03D 1/0675 416/230 |
| 2014/0154456 A1* | 6/2014 | Liou | ............... | B32B 5/26 428/76 |
| 2014/0170408 A1* | 6/2014 | Frulloni | ............... | B32B 5/28 428/301.4 |
| 2015/0140885 A1* | 5/2015 | Eder | ............... | D03D 15/0011 442/136 |
| 2015/0166743 A1* | 6/2015 | Restuccia | ............... | C08J 5/10 428/327 |
| 2015/0218337 A1* | 8/2015 | Studart | ............... | B82Y 30/00 428/215 |
| 2015/0246505 A1* | 9/2015 | Yasue | ............... | B29C 70/24 428/102 |
| 2015/0283788 A1* | 10/2015 | Tsotsis | ............... | B32B 27/18 442/393 |
| 2015/0344666 A1* | 12/2015 | Macosko | ............... | B32B 27/08 442/294 |
| 2016/0023429 A1* | 1/2016 | Voleti | ............... | B32B 5/12 428/113 |
| 2016/0039185 A1* | 2/2016 | Kawabe | ............... | C08J 5/24 428/335 |
| 2016/0089863 A1* | 3/2016 | Fetfatsidis | ............... | H05B 3/06 428/688 |
| 2016/0114500 A1* | 4/2016 | Grodnensky | ............... | B29C 70/025 156/181 |
| 2016/0159998 A1* | 6/2016 | Spencer | ............... | B29C 70/547 156/286 |
| 2016/0257104 A1* | 9/2016 | Wilenski | ............... | B32B 5/00 |
| 2016/0340482 A1* | 11/2016 | Williams | ............... | C04B 35/83 |
| 2017/0129207 A1* | 5/2017 | Hallander | ............... | B29C 70/08 |
| 2018/0023220 A1* | 1/2018 | Hata | ............... | C08K 3/041 423/447.1 |
| 2018/0265217 A1* | 9/2018 | Ballocchi | ............... | C08J 5/005 |

OTHER PUBLICATIONS

Tang et al., Interlaminar fracture toughness and CAI strength of fibre-reinforced composites with nanoparticles—A review, Composites Science and Technology, vol. 86, 2013, p. 26-37 (Year: 2013).*

Khashaba, U.A., In-Plane Shear Properties of Cross-ply Composite Laminates with Different Off-axis Angles, Composite Structures, vol. 65, 167-177 (Year: 2004).*

Subha S., et al., "Effects of Multi Walled Carbon Nanotubes and Alumina Filler on the Mechanical Properties of Polymer Composites", International Journal of Chemtech Research, vol. 7, No. 3, pp. 1272-1278, (2015).

P.S. Shivakumar Gouda, et al., "Effects of Multi Walled Carbon Nanotubes and Graphene on the Mechanical Properties of Hybrid Polymer Composites", Advanced Materials Letters, vol. 4, No. 4, pp. 261-270, (2013).

* cited by examiner

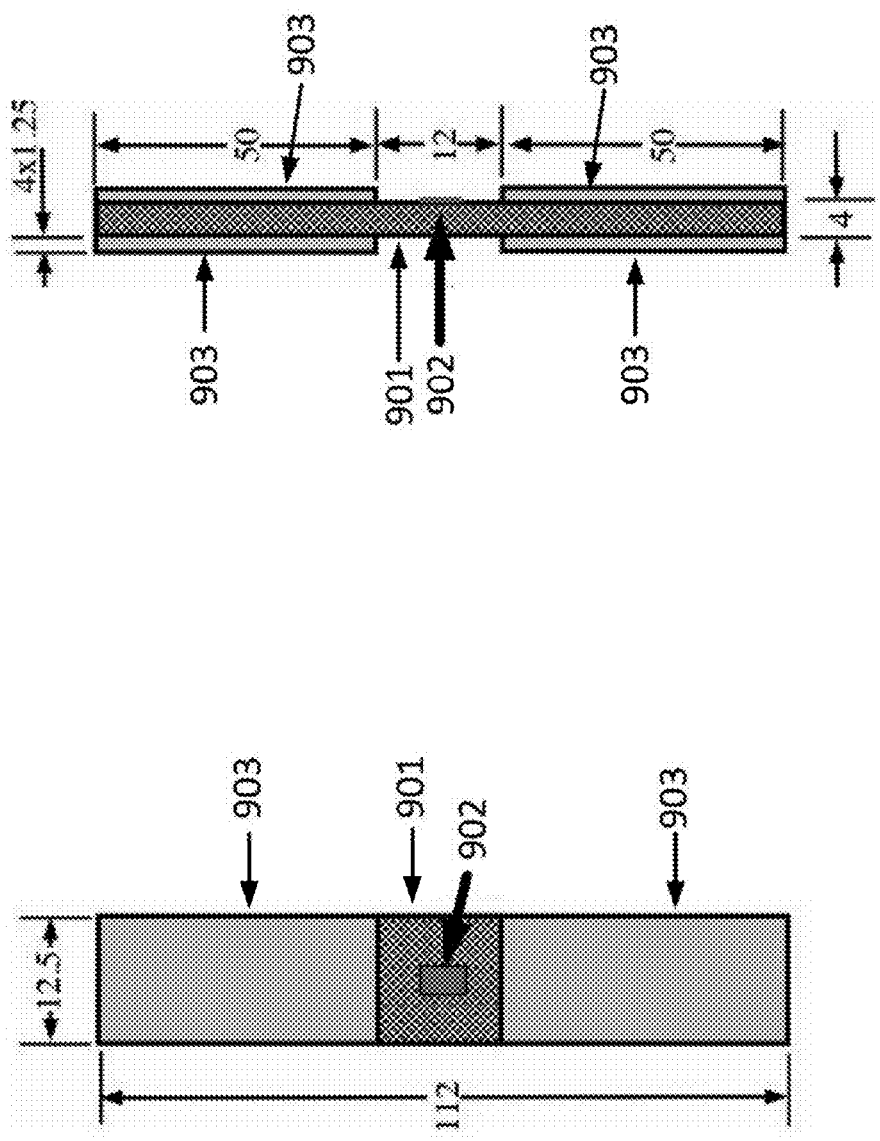

| Material | Tensile Properties | | | |
|---|---|---|---|---|
| | $\sigma_t$ [MPa] | Std. dev. | $E_t$ [GPa] | $\nu_{xy}$ |
| QI-GFR/MWCNT/E | 41.35 | 8.732 | 13.912 | 0.316 |
| UD-GFR/MWCNT/E | 114 | 17.202 | 33.366 | 0.384 |

| Material | Compressive Properties | | |
|---|---|---|---|
| | $\sigma_t$ [MPa] | Std. dev. | $E_t$ [GPa] |
| QI-GFR/MWCNT/E | 240 | 12.833 | 13.01 |
| UD-GFR/MWCNT/E | 260 | 20.272 | 31.904 |

| CNT wt.-% | % Increase |
|---|---|
| 0.5 | 3.5% |
| 1.0 | 5% |
| 1.5 | 7% |

COMPOSITE EPOXY MATERIAL WITH EMBEDDED MWCNT FIBERS AND PROCESS OF MANUFACTURING

CROSS REFERENCE TO RELATED APPLICATIONS

This application claims the benefit of U.S. Provisional Application No. 62/247,980 filed Oct. 29, 2015.

BACKGROUND OF THE INVENTION

Technical Field

The present invention relates to a composite and a method of manufacturing a composite epoxy material with embedded multi walled carbon nanotube (MWCNT) fibers.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Polymer based composites reinforced with a small percentage of strong fillers were shown to significantly improve the thermal, mechanical and barrier properties of the pure polymer matrix. See N. Chisholm, H. Mahfuz, V. K. Rangari, A. Ashfaq, S. Jeelani: Fabrication and mechanical characterization of carbon/SiC epoxy nanocomposites, Composite Structures 67 (2005), pp. 115-124, incorporated herein by reference in its entirety. Moreover, improvements on the thermal, mechanical, and barrier properties were achieved through conventional processing techniques without any detrimental effects on appearance, processing, density and ageing performance of the matrix. Eventually, these composites were considered for a wide range of applications including coating, packaging, electronics, automotive and aerospace industries. While nanoparticles have attractive attributes, they are rarely used in structural composites which have relatively large dimensions. Recently, nanofillers, such as multi walled carbon nanotubes (MWCNT), carbon nanofibers, pyrogenic silica, nanoclay, polyhedral oligomeric silsequioxane, and diatomites, were used by researchers to modify different types of epoxy resin to enhance desired attributes. See K. Tao, S. Yang, J. C. Grunlan, Y. S. Kim; B. Dang, Y. Deng, R. L. Thomas, B. L. Wilson, X. Wei: Effects of Carbon Nanotube Fillers on the Curing Processes of Epoxy Resin-Based Composites, J. Applied Polymer Science 102 (2006), pp. 5248-5254; M. A. Megahed, A. A. Megahed, H. E. M. Sallam, U. A. Khashaba, M. A. Seif, M. Abd Elhamid: Nano-Reinforcement Effects on Tensile Properties of Epoxy Resin, Proc. of the int. Conf. MEATIP5, Assiut University, Egypt (2011), pp. 123-135; X. Zhou, E. Shin, K. W. Wang, C. E. Bakis: Interfacial damping characteristics of carbon nanotube-based composites, Composites Science and Technology 64 (2004), pp. 2425-21437; S. Bal: Experimental study of mechanical and electrical properties of carbon nanofiber/epoxy composites, Materials and Design 31 (2010), pp. 2406-2413; N. Hu, Y. Li, T. Nakamura, T. Katsumata, T. Koshikawa, M. Arai: Reinforcement effects of MWCNT and VGCF in bulk composites and interlayer of CFRP laminates, Composites Part B 43 (2012), pp. 3-9; S. U. Khan, C. Y. Li, N. A. Siddiqui, J. K. Kim: Vibration damping characteristics of carbon fiber-reinforced composites containing multi walled carbon nanotubes, Composites Science and Technology 71 (2011), pp. 1486-149; Zhou, F. Pervin, S. Jeelani, P. K. Mallick: Improvement in mechanical properties of carbon fabric-epoxy composite using carbon nanofibers, J. Materials Processing Technology 198 (2008); pp. 445-453; P. R. Mantena, A. Al-Ostaz, A. H. D. Cheng: Dynamic response and simulations of nanoparticle-enhanced composites, Composites Science and Technology 69 (2009), pp. 772-779; M. R. Ayatollahi, S. Shadlou, M. M. Shokrieh: Fracture toughness of epoxy/multi-walled carbon nanotube nano-composites under bending and shear loading conditions, Materials and Design 32 (2011), pp. 2115-2124; L. Sun, G. L. Warren, J. Y. O'Reilly, W. N. Everett, S. M. Lee, D. Davis, D. Lagoudas, H. J. Sue: Mechanical properties of surface-functionalized SWCNT/epoxy composites, Carbon (2008), pp. 320-328; R. F. Gibson, E O. Ayorinde, Y. F. Wen: Vibrations of carbon nanotubes and their composites: A review, Composites Science and Technology 67 (2007), pp. 1-28; D. Qian, C. Dickey, R. Andrews, T. Rantell: Load transfer and deformation mechanism in carbon nanotube-polystyrene composites, Appl. Phys. Lett. 76 (2000), No. 20, pp. 2868-2870; C. Velasco-Santos, A. L. Martinez-Hernandez, F. Fisher, R. Ruoff, V. M. Castano: Dynamic mechanical and thermal analysis of carbon nanotube-methylethylmethacrylate nano-composites, J. Phys. D. 36 (01/2003), pp. 1423-1428; Z. L. Jin, S. J. Park: Thermal properties of epoxy resin/filler hybrid composites, Polymer Degradation and Stability 97 (2012), pp. 2148-2153; W. Jiang, F. L. Jin, S. J. Park: Thermo-mechanical behaviors of epoxy resins reinforced with nano-Al2O3 particles, Journal of Industrial and Engineering Chemistry 18 (2012), pp. 594-596; M. S. Goyat, S. Ray, P. K. Ghosh: Innovative application of ultrasonic mixing to produce homogeneously mixed nanoparticulate-epoxy composite of improved physical properties, Composites Part A 42 (2011), pp. 1421-1431; O. Akinyede, R. Mohan, A. Kelkar, J. Sankar: Static and fatigue behavior of epoxy/fiberglass composites hybridized with alumina nanoparticles, J. Composite Materials 43 (2009), pp. 769-781; H. Zhao, R. K. Y. Li: Effect of water absorption on the mechanical and dielectric properties of nano-alumina filled epoxy nanocomposites, Composites Part A 39 (2008), pp. 602-611; C. Ocando, A. Tercjak, I. Mondragon: Nanostructured systems based on SBS epoxidized triblock copolymers and weildispersed alumina/epoxy matrix composites, Composites Science and Technology 70 (2010), pp. 1106-1112; S. H. Lim, K. Y. Zeng, C. B. He: Morphology, tensile and fracture characteristics of epoxyalumina nanocomposites, Materials Science and Engineering A 527 (2010), pp. 5670-5676; D. K. Shukla, S. V. Kasisomayajula, V. Parameswaran: Epoxy composites using functionalized alumina platelets as reinforcements, Composites Science and Technology 68 (2008), pp. 3055-3063; M. F. Uddin, C. T. Sun: Improved dispersion and mechanical properties of hybrid nanocomposites, Composites Science and Technology 70 (2010), pp. 223-230, each incorporated herein by reference in its entirety.

Significant effort has been focused on improving epoxy materials using nanofillers such as $TiO_2$, SiC, silver, $SiO_2$, $Al_2O_3$, and carbon nanotubes (CNT). See B. Bittmann, F. Haupert, A. K, Schlarb: Ultrasonic dispersion of inorganic nanoparticles in epoxy resin, Ultrasonics Sonochemistry 16 (2009), pp. 622-628; D. I. Tee, M. Mariatti, A. Azizan, C. H. See, K. F. Chong: Effect of silane-based coupling agent on the properties of silver nanoparticles filled epoxy composites, Composites Science and Technology 67 (2007), pp. 2584-2591; C. Chen, R. S. Justice, D. W. Schaefer, J. W. Baur: Highly dispersed nanosilca epoxy resins with enhanced mechanical properties, Polymer 49 (2008), pp.

3805-3815; H. E. M. Sallam U. A. Khashaba, M. A. Seif, M. Abd-Elhamid, A. A. Megalied, M. A. Megahed: Ultrasonic mixing of nanoparticles in epoxy resin, Proc, of the Int. Conf, on Nano Technology for Green and Sustainable Construction, Cairo, Egypt (2010), pp. 312-316; N. Lachman, H. D. Wagner: Correlation between interfacial molecular structure and mechanics in CNT/epoxy nano-composites, Composites Part A 41 (2010), pp. 1093-1098; S. Ganguli, H. Aglan, P. Dennig, G. Irvin: Effect of loading and surface modification of MWCNTs on the fracture behavior of epoxy nanocomposites, Journal of Reinforced Plastics and Composites (2006), pp. 175-188; J. P. Yang, Z. K. Chen, Q. P. Feng, Y. H. Deng, Y. Li, Q. Q. Ni, S. Y. Yu: Cryogenic mechanical behaviors of carbon nariotube reinforced composites based on modified epoxy by poly(ethersulfone), Composites Part B 43 (2012), pp. 22-26; F. Mujika, G. Vargas, J. Ibarretxe, J. De Gracia, A. Arrese: Influence of the modification with MWCNT on the interlaminar fracture properties of long carbon fiber composites, Composites Part B 43 (2012), pp. 1336-1340; V. K. Srivastava: Modeling and mechanical performance of carbon nanotube/epoxy resin composites, Materials and Design 39 (2012), pp. 432-436; M. R. Loos, J. Yang, D. L. Feke, I. Manas-Zloczower: Effect of block-copolymer dispersants on properties of carbon nanotube/epoxy systems, Composites Science and Technology, 72 (2012), pp. 482-488, each incorporated herein in its entirety. CNT have taken a prominent position for a new generation of high-performance nanocomposites because of their novel structure and several remarkable mechanical, thermal and electrical properties. See H. C. Kim, S. K. Kim, J. T. Kim, K. Y, Rhee, J. Kathi: The Effect of Different Treatment Methods of Multiwalled Carbon Nanotubes on Thermal and Flexural Properties of Their Epoxy Nanocomposites, J. Polymer Science Part Polymer Physics 48 (2010), pp. 1175-1184, incorporated herein by reference in its entirety. CNT are known to have a plastic modulus of up to 1 TPa and predictable tensile strengths in the range of 100 GPa. In combination with these properties, CNT also have unusually low density for lightweight structures. Because of their ultra-small, nanometer scale size and low density, the surface area to mass ratio (specific area) of carbon nanotubes is extremely large. Therefore, a nanotube-based polymeric composite structure can achieve high damping by taking advantage of the interfacial friction between the nanotubes and the polymer resins. In addition, the CNT large aspect ratio and high elastic modulus features allow for the design of such composites with large differences in strain between the constituents, which could further enhance the interfacial energy dissipation ability. See R. M. Lin, C. Lub: Modeling of interfacial friction damping of carbon nanotube-based nanocomposites, Mechanical Systems and Signal Processing 24 (2010), pp. 2996-3012, incorporated herein by reference in its entirety. Accordingly, CNT-based composites are becoming increasingly popular and offer great potential for highly demanding damping applications such as aerospace structures, precision engineering, micro-positioning and control.

The outstanding properties of carbon nanotubes make them promising filler material to improve mechanical, thermal and electrical properties of polymers. The key point is to transfer the potential properties of CNT to the polymer composites. Due to the high-surface energy, nanofillers have a tendency to aggregate together owing to the strong attractive forces. The van der Waals attractive interactions owing to high aspect ratio of nanofillers are another reason for their agglomeration in epoxy resins. The aggregated CNT are in the form of bundles or ropes, usually with highly entangled network structure so that is very difficult to disperse them. See M. Tanahashi: Development of fabrication methods of filler/polymer nanocomposites: With focus on simple melt-compounding-based approach without surface modification of nanofillers, Materials 3 (2010), pp. 1593-1619; A. Montazeri, N. Montazeri: Viscoelastic and mechanical properties of multiwalled carbon nanotube/epoxy composites with different nanotube content, Materials and Design 32 (2011), pp. 2301-2307; S. Yang, W. Lin, Y. Huang, H. Tien, J. Wang, C. M. Ma, S. Li, Y. Wang: Synergetic effects of graphene platelets and carbon nanotubes on the mechanical and thermal properties of epoxy composites, Carbon 49 (2011), pp. 793-803; M. Theodore, M. Hosur, J. Thomas, S. Jeelani: Influence of functionalization on properties of MWCNT-epoxy nanocomposites, Materials Science and Engineering A 528 (2011), pp. 1192-1200; A. Martone, C. Formicola, M. Giordano, M. Zarrelli: Reinforcement efficiency of multiwalled carbon nanotube/epoxy nanocomposites. Composites Science and Technology 70 (2010), pp. 1154-1160, each incorporated herein by reference in its entirety. The homogeneous dispersion of nanofillers within the polymer matrix is a prerequisite of any composites and remains a problem to be solved.

Different techniques have been used to enhance the dispersion of nanofillers in polymer resins, including the use of melt mixing, mechanical shear mixer, sol-gel (modification of the chemical surface of fillers), in situ polymerization, three-roll mill, ball milling and mechanical stirring. According to previous researchers, ultrasonic agitation method is more effective to disperse CNT in epoxy resins. See J. S. Tang, J. Varischetti, G. W. Lee, J. Suhr: Experimental and analytical investigation of mechanical damping and CTE of both SiO2 particle and carbon nanofiber reinforced hybrid epoxy composites, Composites Part A 42 (2011), pp. 98-103; A. Martone, C. Formicola, F. Piscitelli, M. Lavorgna, M. Zarrelli, V. Antonucci, M. Giordano: Thermo-mechanical characterization of epoxy nanocomposites with different carbon nanotube distributions obtained by solvent aided and direct mixing, J. Express Polymer Letters 6 (2012), pp. 520-531, each incorporated herein in its entirety. Currently, high power ultrasonic liquid processors are used to disperse MWCNTs in epoxy resin.

In sonication, the sonication probe generates high-intensity ultrasound waves that penetrate into the liquid filler matrix mixture, where cavitation bubbles can develop and grow during several cycles until they attain a critical diameter, which induces their implosion. This collapse causes extreme local conditions as a very high local pressure and very high temperatures, a so called hot-spot. Due to these hot-spots a splitting up of filler agglomerates can occur. The shock waves from the implosive bubble collapse in combination with micro-streaming generated by cavitation oscillations lead to dispersion effects. If a mixture contains a gas like air, more bubbles will be likely formed during sonication, which can lead to a better dispersion. On the other hand, the entrapped air impairs the flow ability of the mixture. Thus, a positive effect superimposes a negative effect. Sonication parameters can play an important role in enhancement of the dispersion of nanofillers in viscous polymers. These parameters are: sonication power, frequency, amplitude, time, temperature, energy, energy density, dimensions of sonication probe, immersion depth of the sonication probe, and sonication mode (pulsed or continuous), See J. L. Tsai, M. D. Wu: Organoclay effect on mechanical responses of glass/epoxy nanocomposites, Compos. Mater. 6 (2008), pp. 553-568, incorporated herein in its entirety.

The literature on ultrasonic dispersion of nanoparticles in epoxy resin presents varying processing parameters to achieve the dispersion of nanoparticles in epoxy resin. Wide varieties of sonication power were observed by a number of investigators for dispersing nanofillers in epoxy resin: 350 W, 500 W, 600 W, and 750 W. Bittmann et al. found that the dispersion of titanium dioxide nanoparticles in epoxy resin at highest sonication of 100%, and hence the highest power input, leads to the best dispersion result. See S. Zhao, L. S. Schadler, R. Duncan, H. Hillborg, T. Auletta: Mechanisms leading to improved mechanical performance in nanoscale alumina filled epoxy, Composites Science and Technology 68 (2008), pp. 2965-2975, incorporated herein in its entirety. Sonicator probe diameter can play an important role in dispersion of nanofillers in epoxy resin. Most of the supplied probes with the ultrasonic processors have diameters of about 12.5 mm or 25 mm. See O. Asi: Mechanical properties of glass-fiber reinforced epoxy composites filled with $Al_2O_3$ particles, J. Reinforced Plastics and Composites 28 (2009), pp. 2861-2867, herein incorporated in its entirety. Larger sonication probe diameters produce less intensity, but the energy is released over a greater area and accordingly, larger volume can be processed. Therefore, a sonication probe diameter must be considered carefully based on the specific goals of the project.

Sonication in pulsed mode retards the rate of temperature increase in a mixture of epoxy resin and nanoparticles, minimizing unwanted side effects and allowing better temperature control than continuous mode operation. Different pulsing mode intervals were observed by many researchers: 15 s on and 59 s off, 12 s on and 48 s off, 5 s on and 9 s off, 15 s on and 15 s off, and 50 s on and 25 s off. Pulse mode operation with long off periods will help to avoid foaming in samples.

Some researchers studied the viscoelastic and mechanical properties of MWCNT/epoxy composites with different weight fractions by performing tensile and dynamic mechanical thermal analysis (DMTA) tests. The MWCNT/epoxy nanocomposites were fabricated by sonication and a cast molding process. The results showed that the tensile strength and modulus for 2 wt.-% MWCNT increased by 17% and 23%, respectively. Compared to neat epoxy, the dynamic mechanical results indicated a 46% improvement in storage modulus for 0.5 wt.-% MWCNT/epoxy at room temperature.

The influence of alumina nanoparticles and MWCNT in monolithic and hybrid forms on the mechanical properties of nanocomposites was investigated by one study. See A. Alva, A. Raja: Dynamic characteristics of epoxy hybrid nanocomposites, Journal of Reinforced Plastics and Composites 30 (2011), pp. 1857-1867, incorporated herein in its entirety. In the study, the MWCNT were mixed with epoxy resin by manual stirring for 20 min. The results showed that the storage moduli (Young's modulus) of the alumina nanocomposites with 0.5 and 1.0 wt.-% nano-alumina loading, improved by 15.0% and 7.4%, respectively, which are higher than obtained for MWCNT nanocomposites. The authors attributed the lower improvement in the storage moduli of MWCNT nanocomposites to the poor dispersion of MWCNT. Hence, the authors recommended using alternative dispersion techniques such as ultrasonication or a three-roll mixer to minimize the agglomerations of MWCNT in epoxy.

Epoxy monomers react with curing agent during curing to form a three-dimensional cross-linked network with certain thermomechanical properties. The degree and uniformity of curing reaction will affect considerably the bulk material properties. See R. M. Rodgers, H. Mahfuz, V. K. Rangari, S. Jeelani, L. Carlsson: Tensile response of SiC nanoparticles reinforced epoxy composites at room and elevated temperatures, Proc. of the 16th Int. Conf. Composite Materials, Kyoto Japan (2007), pp. 1-6 48; L E. Sawi, P. A. Oiivier, P. Demont, H. Bougherara: Investigation of the effect of double-walled carbon nanotubes on the curing reaction kinetics and shear flow of an epoxy resin, Journal of Applied Polymer Science 126 (2012), pp. 358-366, each incorporated herein in its entirety. Various degrees of nanofiller concentrations may influence curing reactions to a different degree or sometimes with opposite effect. See J. P. Pascault, R. J. J. Williams: Epoxy Polymers New Materials and Innovations, Wiley-VCH Verlag, Weinheim, Germany (2010); M. Preghenella, A. Pegoretti, C. Migliaresi: Thermo-mechanical characterization of fumed silica-epoxy nanocomposites, Polymer 46 (2005), pp. 12065-12072 each incorporated herein in its entirety. Studies showed that both unfunctionalized and functionalized MWCNT have an accelerating influence on the reaction kinetics. Zhou et al. also found that the degree of epoxy cure is decreased by the addition of 1 wt.-% unfunctionlized MWCNT. This result was evidenced by the lower value of the glass transition temperature (Tg) of the cured nanocomposite by 15° C. compared to the neat epoxy. Tao et al. also observed that with only 1 wt.-% of carbon nanotubes, the Tg of epoxy composites was lowered by approximately 10-30° C.

The weight and fuel savings offered by composite materials make them attractive not only to the military, but also to the civilian aircraft, space, and automobile industries. In these industries, bolted and riveted joints are extensively used as a primary method for structural joining. Bolted joints in composite materials have complex failure modes, and hence the demand for improving their performance exists.

In view of the forgoing, the objective of the present invention is to improve the tensile and compressive strength and strain performance of a stacked composite material prepared with glass fiber and a nanocomposite of epoxy resin and MWCNT.

BRIEF SUMMARY OF THE INVENTION

According to a first aspect the present disclosure relates to a stacked composite material comprising at least two glass fiber layers, in which glass fibers within the glass fiber layer are coaxial, and at least three nanocomposite layers comprising multi walled carbon nanotubes dispersed in a cured epoxy matrix, wherein each glass fiber layer is sandwiched between two nanocomposite layers and adjacent and non-contiguous glass fiber layers are oriented in a unidirectional orientation or a quasi-isotropic orientation with respect to the coaxial glass fibers present within each glass fiber layer in the stacked composite material.

In some embodiments, the stacked composite material has a wt % of the multi-wall. carbon nanotubes ranging from 0.5 wt. % to 2.0 wt % relative to the total weight of the epoxy matrix.

In some embodiments of the stacked composite material, a linear density of the glass fibers is between 0.1 g/m to 3.0 g/m.

In some embodiments of the stacked composite material, the multi walled carbon nanotubes have an outer diameter between 1 nm and 10 nm.

In some embodiments of the stacked composite material, the multi walled carbon nanotubes have a length between 5 μm and 40 μm.

In some embodiments of the stacked composite material, the epoxy matrix comprises 50%-90% by weight of at least one epoxy resin, relative to a total weight of the epoxy matrix, and 15%-45% by weight of at least one epoxy hardener relative to the total weight of the epoxy matrix, and wherein the epoxy matrix has a viscosity between 210 centipoise and 410 centipoise in a temperature between −5° C. and 15° C.

In some embodiments of the stacked composite material, at least one epoxy resin comprises bisphenol A and/or bisphenol F and the at least one epoxy hardener comprises at least one selected from the group consisting of a cycloaliphatic amine, an aliphatic amine, and a thiol.

In some embodiments, the stacked composite material has at least 17 total layers of the glass fiber layer and the nanocomposite layer, wherein the nanocomposite layer forms a first layer and a last layer of the stacked composite material.

In some embodiments of the stacked composite material, adjacent and noncontiguous glass fiber layers are oriented in a quasi-isotropic orientation with respect to the coaxial glass fibers present within each glass fiber layer, and wherein the glass fiber layers have an orientation angle sequence of approximately 0°, approximately 45°, approximately 135°, or approximately 90° within the stacked composite material.

In some embodiments of the stacked composite material, the orientation angle sequence is a palindromic sequence organized by an orientation angle of each glass fiber layer.

In some embodiments of the stacked composite material, a glass fiber volume fraction is between 25% and 45% of the total volume of the stacked composite material.

In some embodiments, the stacked composite material has a tensile strength between 36 mega pascals to 45 mega pascals and a tensile strain between 8 giga pascals to 18 giga pascals.

In some embodiments, the stacked composite material has a compressive strength between 220 mega pascals to 260 mega pascals and compressive strain between 8 giga pascals to 18 giga pascals.

According to a second aspect, the present disclosure relates to a method of preparing a stacked composite material comprising applying a nanocomposite layer comprising multi walled carbon nanotubes dispersed in an epoxy matrix, onto a glass surface, overlaying a glass fiber layer on top of the nanocomposite layer, wherein the glass fiber layer comprises glass fibers which are coaxial, rolling an aluminum roller over the glass fiber layer in a direction parallel to a longitudinal axis of the glass fibers, repeating the applying, overlaying, and rolling, wherein each glass fiber layer is sandwiched between two nanocomposite layers and each glass fiber layer is oriented in a unidirectional orientation or a quasi-isotropic orientation relative to an adjacent and noncontiguous glass fiber layer, and covering with a plate and curing to form the stacked composite material.

In some embodiments, the method produces a stacked composite material having at least 17 total layers of the glass fiber layer and the nanocomposite layer stacked concentrically in an alternating sequence and the nanocomposite layer forms a first layer and a last layer of the stacked composite material.

In some embodiments, the method produces a stacked composite material having adjacent and noncontiguous glass fiber layers which are oriented in a quasi-isotropic orientation with respect to the coaxial glass fibers present within each glass fiber layer, and wherein the glass fiber layers have an orientation angle sequence of approximately 0°, approximate 45°, approximately 135°, or approximately 90° within the stacked composite material.

In some embodiments of the method, the orientation angle sequence is a palindromic sequence organized by an orientation angle of each glass fiber layer.

In some embodiments of the method, the curing comprises applying pressure to the plate for 16 hours to 48 hours then releasing the pressure and holding for 15 days to 30 days under ambient temperature.

In some embodiments of the method, the pressure applied to the plate is between 100 kg/m$^2$ and 200 kg/m$^2$ and the pressure is applied uniformly to the plate.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9A is a schematic of a view of a test specimen of a stacked composite material for compressive tests;

FIG. 9B is a schematic of an alternate view of a test specimen of a stacked composite material for compressive tests;

DETAILED DESCRIPTION OF THE EMBODIMENTS

Figure 1:
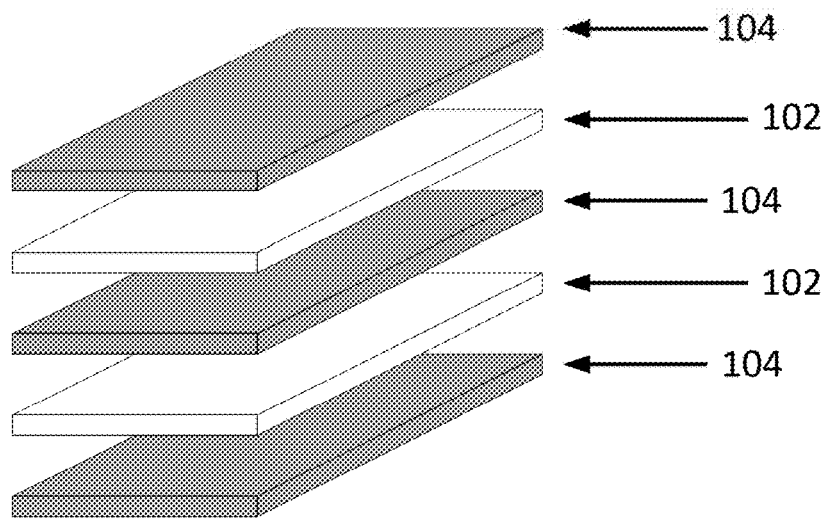
FIG. 1 is an exemplary expanded orthogonal view of the stacked composite material having multiple glass fiber layers 104 sandwiched between nanocomposite layers 102.

Referring now to the drawings, wherein like reference numerals designate identical or corresponding parts throughout the several views.

The present disclosure pertains to a stacked composite material comprising at least two glass fiber layer and at least three nanocomposite layers. Each glass fiber layer is sandwiched between two nanocomposite layers. A shape of stacked composite material may include, but is not limited to rectangular, cylindrical, or three dimensional polygon. The stacked composite material may also be in the shape of a sphere. The stacked composite material may be formed as a rectangle and cut into customized shapes.

Figure 2:
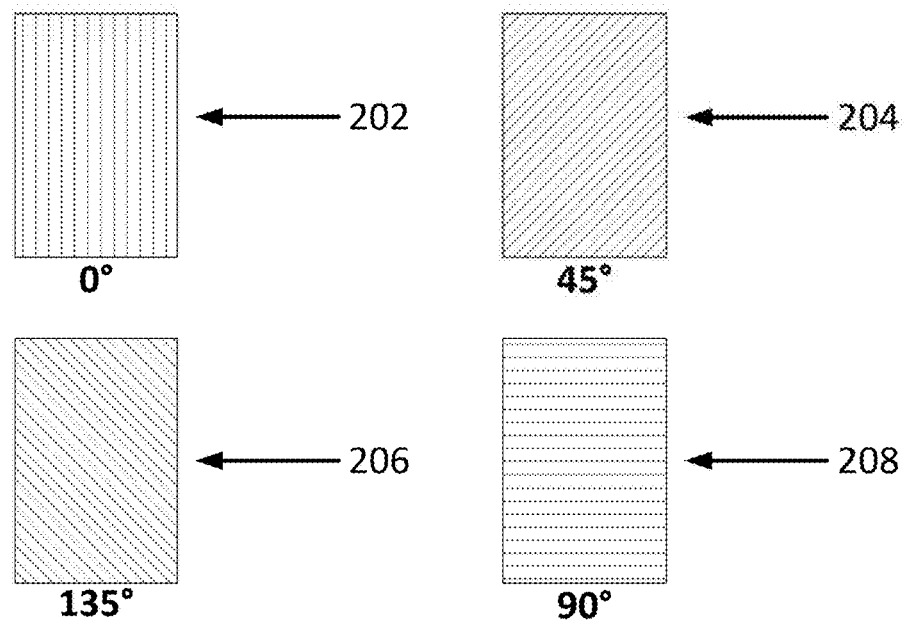
FIG. 2 is an exemplary depiction of orientations of glass fibers within a glass fiber layer.

Within the glass fiber layer there are glass fibers oriented coaxially. A pair of glass fibers may be coaxial if the pair of glass fibers are within 20° of parallel, within 15° of parallel, within 10° of parallel, within 5° of the parallel, and/or within 1° of parallel. Within each glass fiber layer, of the total number of glass fibers present in the glass fiber layer at least 50% are coaxial, at least 60% are coaxial, at least 70% are coaxial, at least 80% are coaxial, and at least 90% are coaxial. In the stacked composite material, there may be multiple glass fiber layers each sandwiched between nanocomposite layers. FIG. 1 depicts an exemplary expanded orthogonal view of the stacked composite material having multiple glass fiber layers 104 sandwiched between nanocomposite layers 102. Glass fibers within the glass fiber layer may be oriented at an angle in reference to a longitudinal axis of the layer. The angle to which the glass fibers within the glass fiber layer may be oriented are schematically depicted in FIG. 2 at approximately 0° 202, at approximately 45° 204, at approximately 135° 206, or at approximately 90° 208. The descriptor "approximately," as used herein may indicate within ±1% of the measurement, within ±5% of the measurement, within ±10% of the measurement, or within ±15% of the measurement. Adjacent and noncontiguous glass fiber layers which are oriented in the same direction are in a unidirectional orientation (FIG. 3A) the stacked composite material. Adjacent and noncontiguous glass fiber layers which may each be oriented in different directions are in a quasi-isotropic orientation (FIG. 3B) in the stacked composite material.

In some embodiments the glass fiber aye comprises glass fiber roving. The glass fibers roving may include, but are not limited to alkali glass, alkali resistant glass, corrosive resistant glass, low dielectric constant glass, alkali-free and electrically resistive glass, acid-corrosion resistive glass, calcium aluminosilicate glass, magnesium aluminosilicate glass, or combinations thereof.

In some embodiments of the stacked composite materials, the glass fiber layer may also comprise non-glass fibers including, but not limited to graphite fibers, cellulose fibers and aramid fibers. The non-glass fiber content may be no more than 20%, no more than 15%, no more than 10%, or no more than 5% of the total fiber content in a glass fiber layer.

In some embodiments of the stacked composite material, a linear density of the glass fibers is between 0.10 g/m to 3.0 g/m, between 0.50 g/m to 2.5 g/m, between 1.0 g/m to 2.0 g/m.

In some embodiments of the stacked composite material, a glass fiber volume fraction of the total volume of the stacked composite material is between 15% and 50%, between 20% and 45%, between 25% and 40%.

The nanocomposite layer comprises multi walled carbon nanotubes (MWCNT) dispersed in an epoxy matrix. The epoxy matrix may comprise 50%-90%, 60%-80%, or 65%-75% by weight of at least one epoxy resin, relative to a total weight of the epoxy matrix, and 15%-45%, 20%-40%, or 25%-35% by weight of at least one epoxy hardener relative to the total weight of the epoxy matrix. For example, the epoxy resin may comprise bisphenol A and/or bisphenol F, such as Huntsman Araldite® PY 1092-1 or Emerald Performance Materials EPALLOY® 7192, For example, the epoxy hardener may comprise at least one compound selected from the group consisting of a cycloaliphatic amine, an aliphatic amine, and a thiol, such as Huntsman Araldite® HY 1092 or Bruno Bock THIOCURE® ETTMP. Some formulations of the epoxy matrix may also include secondary resins, such as novolac epoxy resin, aliphatic epoxy resins, or glycidylamine epoxy resin for temperature resistance exceeding 150° C. and up to 500° C. Some formulations of the epoxy matrix may further include additives such as, but not limited to, plasticizers, anti-degradation agents, diluents, toughening agents, pigments, clay fillers, and combinations-thereof. Of the total weight of the epoxy matrix, the percentage by weight of the secondary resins and additives may be no more than 15%, no more than 10%, or no more than 5%.

Multi-walled nanotubes consist of multiple rolled layers (concentric tubes) of graphene. There are two models that can be used to describe the structures of multi-walled nanotubes. In the Russian Doll model, sheets of graphite are arranged in concentric cylinders, for example, a single-walled nanotube within a larger single-walled nanotube. In the Parchment model, a single sheet of graphite is rolled in around itself, resembling a scroll of parchment or a rolled newspaper. The interlayer distance in multi-walled nanotubes is close to the distance between graphene layers in graphite, approximately 3.4 Å. The Russian Doll structure is observed more commonly.

Figure 4:
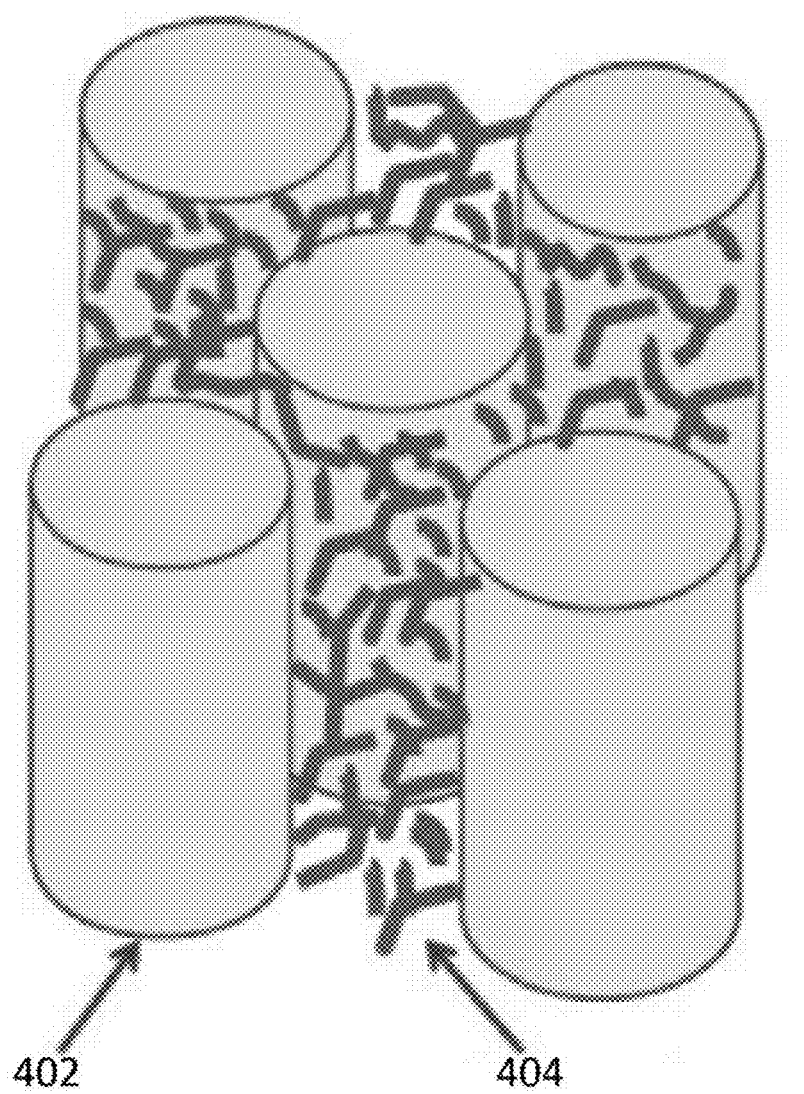
FIG. 4 is a schematic depiction of how MWCNT dispersed in the epoxy matrix 404 may surround glass fibers 402 in the glass fiber layer at an interface between the glass fiber layer and the nanocomposite layer.

The MWCNT may be dispersed in the epoxy matrix by methods including but not limited to, mechanical mixing, roller mixing, sonicating, ultrasonic liquid processing, or shaking. Dispersing the MWCNT into the epoxy matrix may be most effectively accomplished when a viscosity of the epoxy is between 210 cP and 410 cP, preferably between 230 cP and 390 cP, more preferably between 250 cP and 370 cP, most preferably between 280 cP and 350 cP, between 300 cP and 330 cP, and between 310 cP and 320 cP. The temperature of the epoxy matrix during dispersion of the MWCNT and preparation of the stacked composite material may be between −5° C. and 15° C., between −2° C. and 10° C., preferably between 0° C. and 5° C. The MWCNT may be aligned coaxially in the epoxy matrix of may be randomly dispersed. FIG. 4 depicts how MWCNT dispersed in the epoxy matrix 404 may surround glass fibers 402 in the glass fiber layer at an interface between the glass fiber layer and the nanocomposite layer.

In some embodiments, the multi-wall carbon nanotubes may range from 0.1 wt. % to 3.0 wt. %, 0.3 wt. % to 2.5 wt. %, 0.5 wt. % to 2.0 wt. %, or 0.75 wt. % to 1.5 wt. % relative to the total weight of the epoxy matrix. In some embodiments, the MWCNT may have an outer diameter between 0.5 mm and 15 mm, 0.75 mm and 12 mm, 1 mm and 10 mm, or between 2 mm and 8 mm. In some embodiments of the stacked composite material, the multi walled carbon nanotubes have a length between 1 μm and 50 μm, between 5 μm and 40 μm, between 10 μm and 30 μm, or between 15 μm and 25 μm. In some formulations, the MWCNT may be functionalized by carboxylic acid or hydroxyl groups by oxidation with strong acids or by amine groups by diazonium reactions and then, with a crosslinking agent or catalyst, react with the epoxy. The crosslinking agent or crosslinking catalyst may be at least one compound selected from the group consisting of glutaraldehyde compounds 1,4 benzoquinone, epichlorohydrin compounds, or carbodimide compounds.

In some embodiments, the stacked composite material may have a total number of layers of the glass fiber layer and the nanocomposite layer of at least 17 total layers, or any sum of layers fulfilling the function 2n+1, where n is any positive integer greater than 8. For example, the total layers may be 17, 19, 21, 23, etc. The nanocomposite layer may form a first layer and a last layer of the stacked composite material.

In some embodiments of the stacked composite material, adjacent and noncontiguous glass fiber layers are oriented in a quasi-isotropic orientation with respect to the coaxial glass fibers present within each glass fiber layer, and wherein the glass fiber layers have an orientation angle sequence of approximately 0°, approximately 45°, approximately 135°, or approximately 90° within the stacked composite material.

Figure 5A:
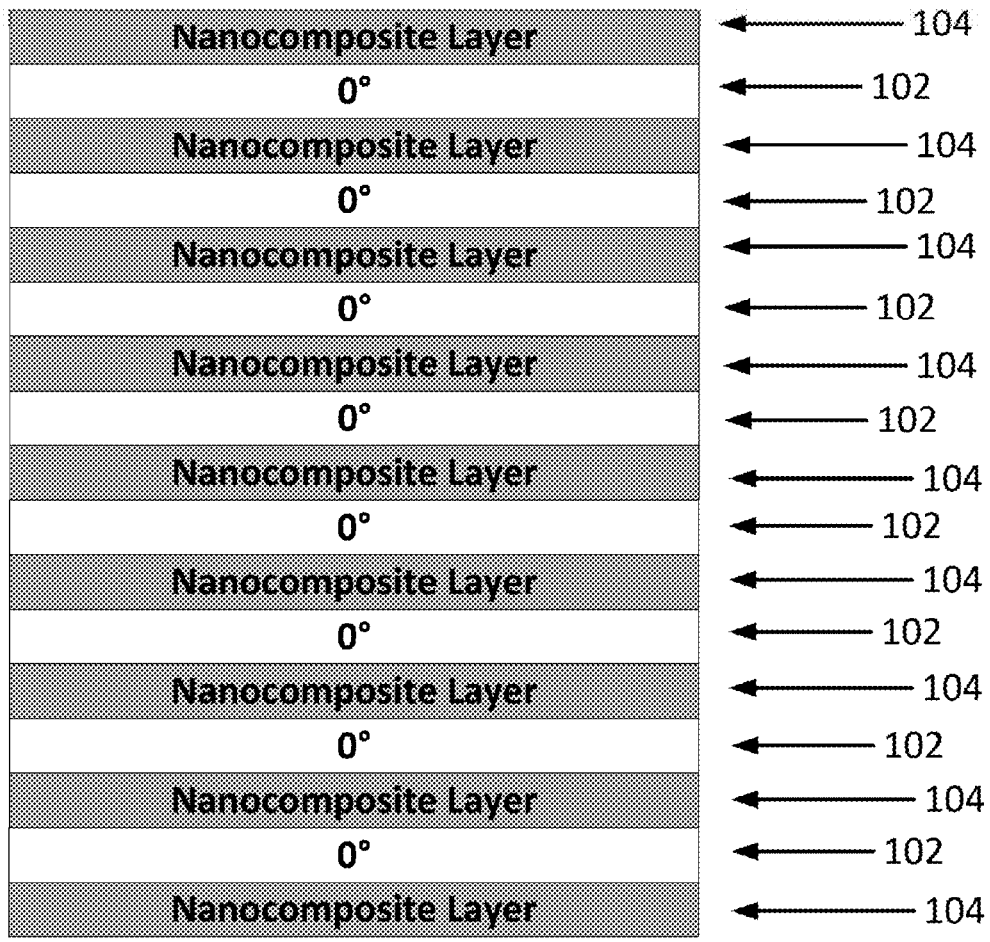
FIG. 5A is a depiction of a schematic example of a 17 layer unidirectional stacked composite material.
Figure 5B:
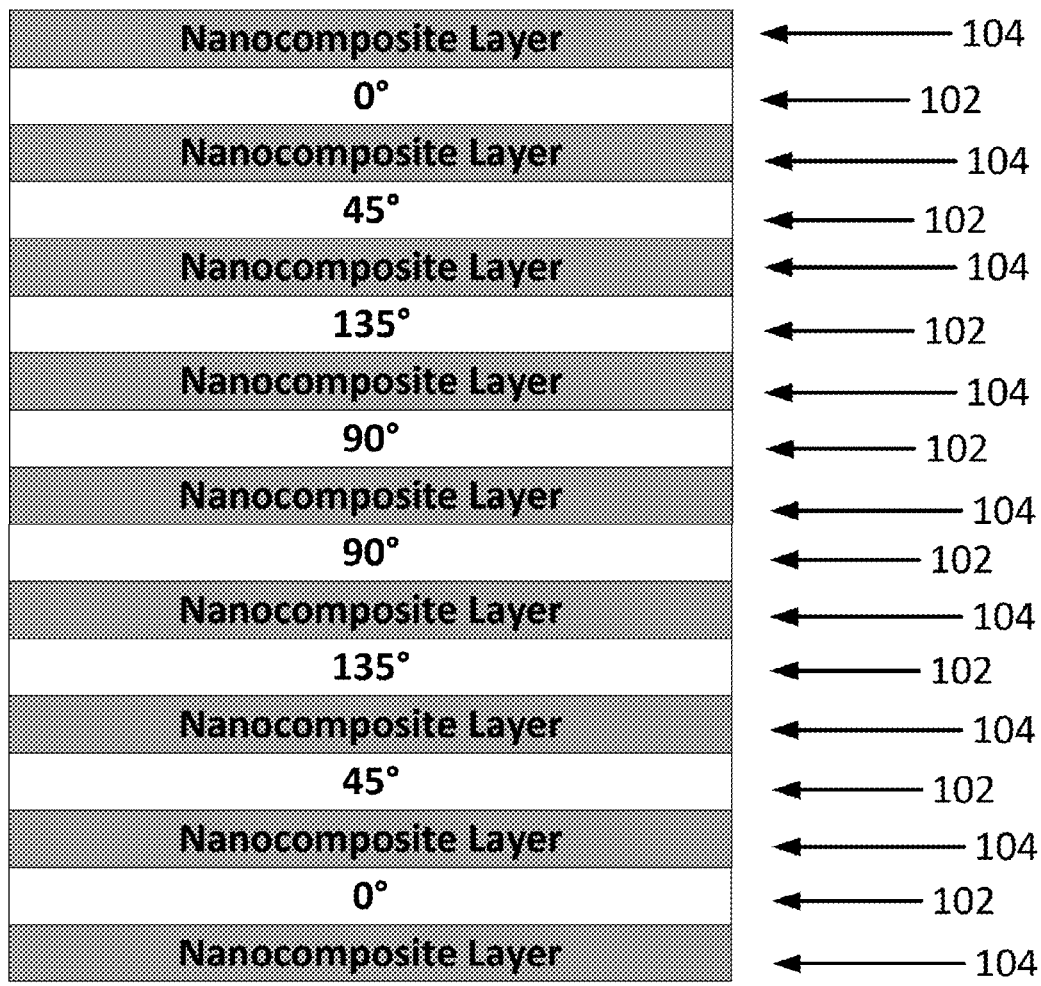
FIG. 5B is a depiction of a schematic example of a 17 layer quasi-isotropic stacked composite material.

In some embodiments of the stacked composite material, the orientation angle sequence is a palindromic sequence organized by an orientation angle of each glass fiber layer, FIG. 5A and FIG. 5B depicts a schematic example of the 17 layer stacked composite material with the palindromic sequence by the orientation angle. The palindromic sequence of the glass fiber layers between nanocomposite layer may follow the order 0°, 45°, 135°, 90°, 90°, 135°, 45°, and 0°. FIG. 5A depicts a schematic example of a 17 layer unidirectional stacked composite material and FIG. 5B depicts a schematic example of a 17 layer quasi-isotropic stacked composite material.

In some embodiments of the stacked composite material, a distance between the glass fiber layers may be between 0.5 mm and 10 mm, between 1 mm and 7 mm, or between 2 mm and 5 mm. The distance between one glass fiber layer and the adjacent and noncontiguous glass fiber layer may be consistent throughout the stacked composite material or may vary by at most 20%, at most 15%, at most 10%, at most 5%, and/or at most 1%.

In some embodiments, the stacked composite material may have a tensile strength between 25 mega Pascals to 55 mega Pascals, between 30 mega pascals to 50 mega pascals, or between 35 mega pascals to 45 mega pascals. The stacked composite material may have a tensile strain between 5 giga pascals to 25 giga pascals, between 10 giga pascals to 20 giga pascals, or between 12 giga pascals to 15 giga pascals.

In some embodiments, the stacked composite material may have a compressive strength between 180 mega pascals to 300 mega pascals, between 200 mega pascals to 280 mega pascals, or between 220 mega pascals to 260 mega pascals. The stacked composite material may have a compressive strain between 5 giga pascals to 25 giga pascals, between 10 giga pascals to 20 giga pascals, or between 12 giga pascals to 15 giga pascals.

In some embodiments, the stacked composite material consists of at least one glass fiber layer, wherein glass fibers present in the glass fiber layer are coaxial; at least two nanocomposite layers comprising multi walled carbon nanotubes dispersed in an epoxy matrix, in which each glass fiber layer is sandwiched between two nanocomposite layers, and adjacent and noncontiguous glass fiber layers are oriented in the unidirectional orientation or the quasi-isotropic orientation with respect to the coaxial glass fibers present within each glass fiber layer in the stacked composite material.

In some embodiments, the stacked composite materials consists of eight glass fiber layers and nine nanocomposite layers, wherein each glass fiber layer s sandwiched between two nanocomposite layers and adjacent and noncontiguous glass fiber layers are oriented in the unidirectional orientation with respect to the coaxial glass fibers present within each glass fiber layer in the stacked composite material.

In some embodiments, the stacked composite materials consists of eight glass fiber layers and nine nanocomposite layers, wherein each glass fiber layer is sandwiched between two nanocomposite layers and adjacent and noncontiguous glass fiber layers are oriented in the quasi-isotropic orientation with respect to the coaxial glass fibers present within each glass fiber layer in the stacked composite material.

A second aspect of the present disclosure is a method of preparing the stacked composite material described herein. The method includes applying a nanocomposite layer comprising multi walled carbon nanotubes dispersed in an epoxy matrix, in which a first layer of the nanocomposite layer is brushed onto a mold comprising a substrate. The substrate may comprise glass and/or plastic. The method further includes overlaying a glass fiber layer on top of the nanocomposite layer. The glass fiber layer comprises glass fibers which are coaxial. The glass fibers may be manually positioned in the mold or may be mechanically attached to the mold by clips or staples to the outer frame of the mold as each layer is overlaid. The method further includes rolling a roller over the glass fiber layer in a direction parallel to a longitudinal axis of the glass fibers. The method further includes repeating the applying, overlaying, and rolling to form a stacked composite material, wherein each glass fiber layer is sandwiched between two nanocomposite layers. Each glass fiber layer ay be oriented in a unidirectional orientation or a quasi-isotropic orientation relative to an adjacent and noncontiguous glass fiber layer, as described herein. The method further includes applying the nanocomposite layer over the preceding glass fiber layer to form a final layer of the stacked composite material and covering the stacked composite material inside the mold with a plate and curing the stacked composite material.

The applying of the nanocomposite layer may include, but is not limited to brushing, dipping, and spraying. Brushing may be described as spreading a brush coated with the epoxy matrix with MWCNT to apply the nanocomposite layer onto the substrate or a preceding glass fiber layer. Dipping may include immersing an interior portion of the mold into a container retaining a volume of the epoxy matrix with MWCNT. Spraying may be described as using pressurized air to force the epoxy matrix with MWCNT through a nozzle to introduce an evenly distributed nanocomposite layer onto the mold or a preceding glass fiber layer.

In some implementations, the stacked composite material may comprise at least a total of 17 layers of the glass fiber layer such that the nanocomposite layer may be stacked concentrically in an alternating sequence with the glass fiber layer, and the nanocomposite layer forms a first layer and a last layer of the stacked composite material. As described herein, there may be more than 17 layers in the stacked composite material.

Figure 3B:
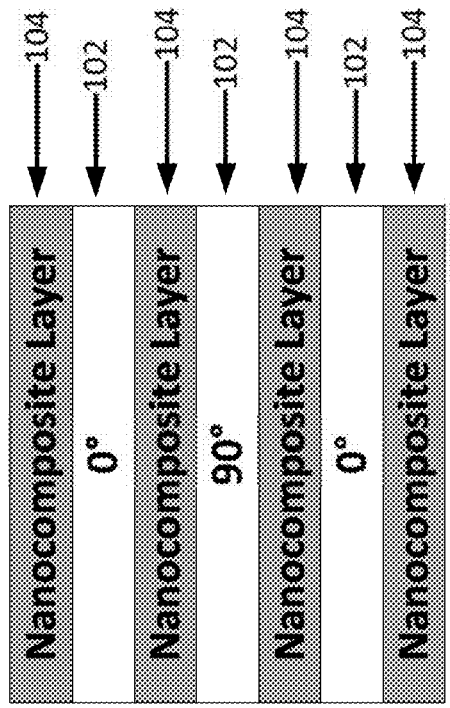
FIG. 3B is an exemplary depiction of adjacent and noncontiguous glass fiber layers which are oriented in different directions and are in a quasi-isotropic orientation in the stacked composite material.
Figure 3A:
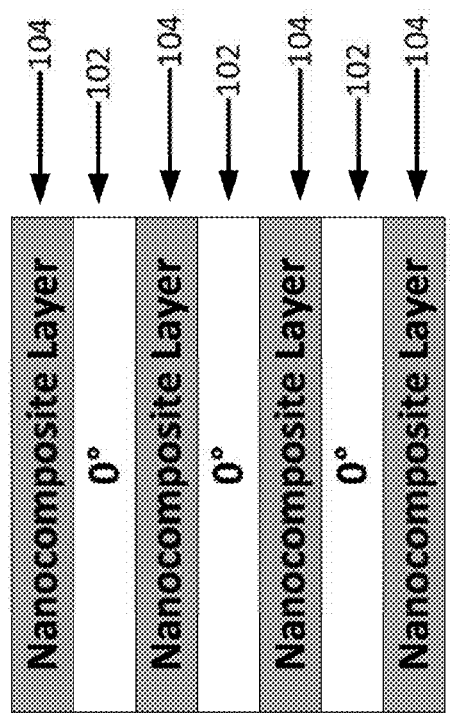
FIG. 3A is an exemplary depiction of adjacent and noncontiguous glass fiber layers which are oriented in the same direction and are in a unidirectional orientation in the stacked composite material.

When more than one glass fiber layers are prepared in the stacked composite material adjacent and noncontiguous glass fiber layers may be oriented in a quasi-isotropic orientation with respect to the coaxial glass fibers present within each glass fiber layer as depicted in FIG. 3B. The glass fiber layers may have an orientation angle sequence of approximately 0°, approximately 45°, approximately 135°, or approximately 90° within the stacked composite material. The orientation angle of 0° is parallel to the longitudinal axis of the mold. In a non-rectangular mold, an axis may be selected in one layer as a reference axis for all measurements of the orientation angle. In FIG. 5B depicts a schematic example of the 17 layer stacked composite material with the palindromic sequence by the orientation angle as well as a quasi-isotropic orientation of an exemplary stacked composite material. FIG. 5A depicts a schematic example of the 17 layer stacked composite material in the unidirectional orientation.

Figure 6:
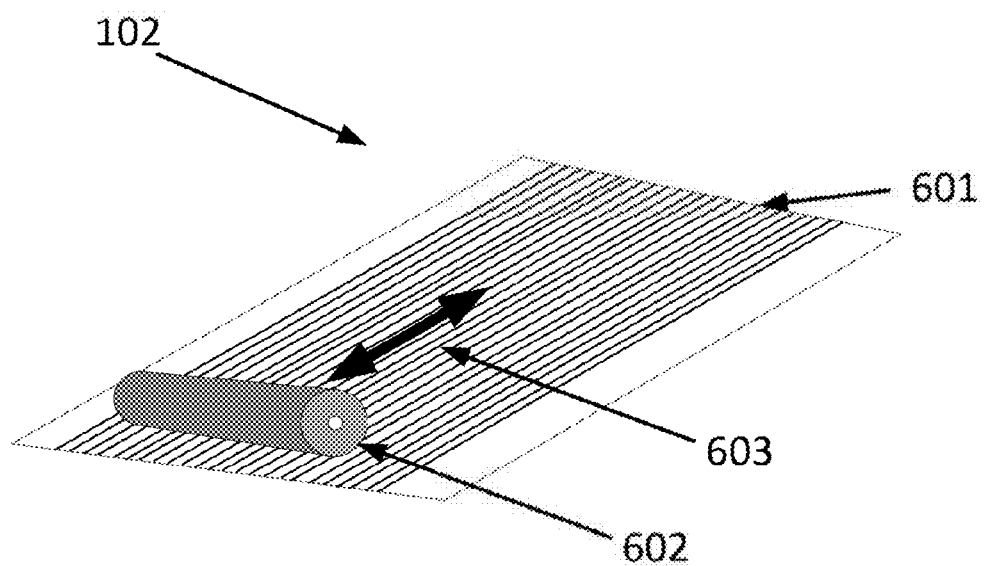
FIG. 6 is a depiction of an exemplary glass fiber layer 120 with exemplary glass fibers 601 and an exemplary aluminum roller 602, which rolls parallel to the longitudinal axis of the glass fibers 603.

After overlaying the glass fiber layer, the method calls for rolling a roller over the glass fiber layer. The roller may be metal, wood, plastic, glass, or a combination thereof. FIG. 6 depicts and exemplary glass fiber layer 102 with exemplary glass fibers 601 and an exemplary roller 602. The rolling may occur in parallel to the longitudinal axis of the glass fibers as depicted in FIG. 6 by the directional arrows 603. An outer face of the roller may be patterned with ridges perpendicular to the longitudinal axis of the roller, ridges parallel to the longitudinal axis of the roller, or both. The roller may be weighted by 0.5 kg-12 kg, by 2 kg-10 kg, or by 4 kg-8 kg.

Rolling the roller over the glass fiber layer may contribute in removing any visible air bubbles in the glass fiber layer and the nanocomposite layer, providing fast impregnation and good wetting of glass fibers with the MWCNT in the epoxy matrix. Accordingly, this improves interfacial bond strength between the glass fiber and epoxy matrix. The interfacial bond strength measures the improvement in the transfer of stress or mechanical loads from the epoxy matrix to the glass fibers via the MWCNT. Accordingly, this improves mechanical properties of the stacked composite material. In addition, applying rolling with moderate pressure may de-agglomerate the MWCNT resulting from to the attractive forces between individual MWCNT and the van der Waals interactions.

In some implementations, curing of the stacked composite material comprises applying pressure to the plate for a prolonged period to assure uniform and complete curing. The plate may comprise glass, plastic, or metal and may be coated with a wax or non-adhering coating to prevent adhesion to the nanocomposite material. The pressure applied to the plate is between 50 k g/m$^2$ and 300 kg/m$^2$, 75 kg/m$^2$ and 250 kg/m$^2$, 125 kg/m$^2$ and 175 kg/m$^2$ and the pressure is applied uniformly to the plate. With pressure applied the stacked composite material may be cured for 8 hours 60 hours, 16 hours 50 hours, and 20 hours to 40 hours then releasing the pressure and holding the stacked composite material at ambient temperature, the stacked composite material may be continually cured for 1 day to 35 days, 7 days to 30 days, or 14 days to 25 days. Throughout the duration of curing a relative humidity may be 0.1%-65%, 1.0%-60%, 5%-55%, 10%-50%, 15%-45%, 20%-40%, or 25%-35%, most preferably 15%-45% relative humidity. In some implementations, the curing of the stacked composite material may comprise a fast curing in which the stacked composite material may be placed in an oven of a temperature 35° C.-100° C., 45° C.-90° C., 55° C.-80° C., or 65° C.-70° C. The fast curing may continue for 0.5 hours-5 hours, 1 hour-4.5 hours, 1.5 hours-4 hours, 2 hours-3.5 hours, or 2.5 hours-3 hours.

In some implementations, the method of preparing the stacked composite material consists of applying the nanocomposite layer comprising multi walled carbon nanotubes dispersed in the epoxy matrix, in which the first layer of the nanocomposite layer is brushed onto a mold comprising the substrate. The method further consists of overlaying a glass fiber layer on top of the nanocomposite layer. The glass fiber layer consists of glass fibers which are coaxial. The method further consists of rolling a roller over the glass fiber layer in a direction parallel to a longitudinal axis of the glass fibers. The method further consists of repeating the applying, overlaying, and rolling to form a stacked composite material, wherein each glass fiber layer is sandwiched between two nanocomposite layers. Each glass fiber layer may be oriented in a unidirectional orientation or a quasi-isotropic as described herein. The method further consists of applying the nanocomposite layer over the preceding glass fiber layer to form the final layer of the stacked composite material and covering the stacked composite material inside the mold with the plate and curing the stacked composite material.

The examples below are intended to further illustrate protocols for the preparation and characteristics of the stacked composite materials described above, and are not intended to limit the scope of the claims. The examples are drawn from Aldousari, Saad M., et al. "Design, Manufacture and Analysis of Composite Epoxy Material with Embedded MWCNT Fibers." Materials Testing 56.11-12 (2014): 1029-1041, herein incorporated by reference in its entirety.

EXAMPLE 1

Materials

The selected percent of multi walled carbon nanotube (MWCNT) at 1 wt.-% showed improvement in the mechanical properties of stacked composite materials. FIG. 4 depicts how MWCNT dispersed in the epoxy matrix 404 may surround glass fibers 402 in the glass fiber layer at an interface between the glass fiber layer and the nanocomposite layer.

Preparation of Epoxy Matrix

Epoxy part A (100 parts by weight) was mixed with epoxy part B (45 parts by weight) and stirred manually for 10 min. The hardener (epoxy part B) was added gradually (i.e. drop by drop) while the mixture was stirred.

Preparation of Nanocomposites

In the present work, two different types of nanocomposites were fabricated including 1 wt.-% MWCNT and without MWCNT. The MWCNT was dispersed in epoxy resin using a high intensity ultrasonic liquid processor, Cole-Parmer Inc., USA.

After sonication, the hardener was added to the epoxy resin and manually stirred for 10 min. Then the nanocomposite epoxy matrix is ready to be poured into the mold and/or over the glass fiber layer.

Fabrication of Quasi-Isotropic [0/451135/90]s Glass Fiber Reinforced Epoxy Composite Laminates.

The quasi-isotropic [0/45/135/90]s glass fiber reinforced stacked composite material was fabricated using hand lay-up technique that was developed for fabricating other types of composite materials. Eight templates were used to lay-up the fiber bundles in 0°, +45°, 135°, 90°, 90°, 135°, +45°, and 0° directions as shown in FIG. 5B. The parallel bundles of fibers were fixed on the frame of the templates. The distance between the adjacent bundles was 5 nm. The upper surface of the mold was a glass plate (600×400 mm) treated by release agent (liquid wax). The first layer of the nanocomposite layer was spread on the mold. The first template with glass fiber in 0° direction was placed on the nanocomposite layer and consolidated using aluminum roller 602 with longitudinally narrow slots parallel to its axis and perpendicular to the fiber directions as shown in FIG. 6. Rolling was continued until the layer was fully impregnated and all visible air inclusions were removed. This procedure was repeated with alternative layers of the nanocomposite layer and the next glass fiber layers, which were in the following sequence: +45°, 135°, 90°, 90°, 135°, +45°, and 0°. The last layer (nanocomposite) was covered by a Canson paper that was wound on a smooth round aluminum pipe and rolled to remove any visible air bubbles and squeeze the excess resin. To obtain smooth upper surface with nearly constant thickness a glass plate was placed on the Canson paper. In accordance with BS 3496, a weight of 30 kg was distributed on the glass plate.

The stacked composite material was procured under uniform pressure for 24 h at room temperature, ISO 1268, and post-cured at room temperature for further 21 days. The margins of the stacked composite material, up to at least 20 mm from the edge, were cut and the working portion of the specimens was taken away from the edge by about 30 nm.

The quasi-isotropic [0/45/135/90]s glass fiber reinforced stacked composite material. (QI-GFR/MWCNT/E) was manufactured by using nanocomposite epoxy resin having MWCNT in the epoxy matrix. Applying rolling using the aluminum roller during the fabrication of stacked composite material played an important role in de-agglomeration of the MWCNT and accordingly, improves the interfacial interaction between the nanocomposite layer and glass fibers. Rolling also contributed to better wetting of glass fibers with the nanocomposite epoxy and removed any visible air bubbles and subsequently, improving the mechanical properties of the stacked composite materials.

Fabrication of UD-GFR/E Composite Laminates

The stacked composite material with unidirectional glass fiber layers (FIG. 5B) were fabricated by following the same manufacturing procedure of quasi-isotropic stacked composite material using eight layers of unidirectional glass fiber [0°]. The fiber volume fractions ($V_f$) of the manufactured laminates were determined experimentally using the ignition technique according to ASTMD3171. The average value of $V_f$ is 33.7±0.4%. The variation of $V_f$ (±0.4%) was due to the thickness variation during lay-up architecture of hybrid multi-scale composite laminates with different fiber configurations. On the other hand, the variation of $V_f$ in the same laminate did not exceed 0.1%.

EXAMPLE 2

Mechanical Characterization

The mechanical (tension, compression, and in plane shear) and bolted joint properties of the investigated materials were determined in accordance with a series of ASTMs using computer controlled universal testing machine model CMT5205/5305 MTS SYSTEMS. The mechanical tests were performed at constant cross-head speed of 2 mm/min. The experimental results and the standard deviation are estimated and presented in the results section.

Tension Tests

The test specimens of stacked composite material were prepared and tested in accordance with ASTM standard D 638. The test specimens were cut into strips with dimensions of 165 mm×20 mm width. The strips then machined to the dimensions illustrated in FIG. 7A, FIG. 7B, and FIG. 7C using milling machine.

Figure 7A:
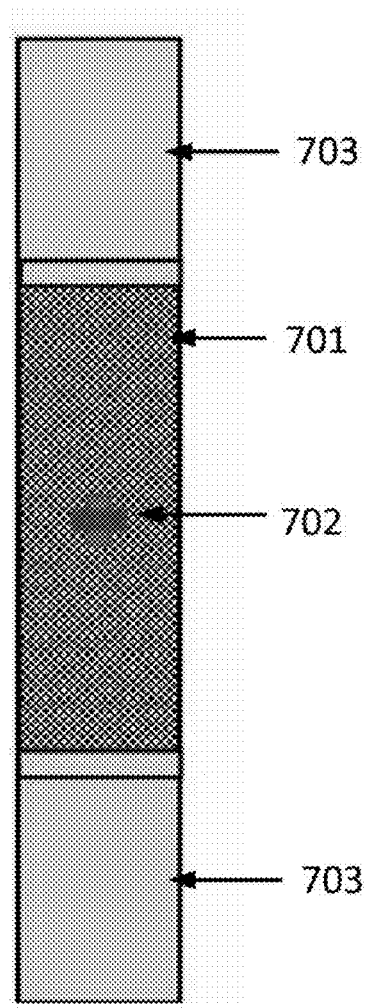
FIG. 7A is a schematic of a view of a test specimen of stacked composite material for tension tests.
Figure 7B:
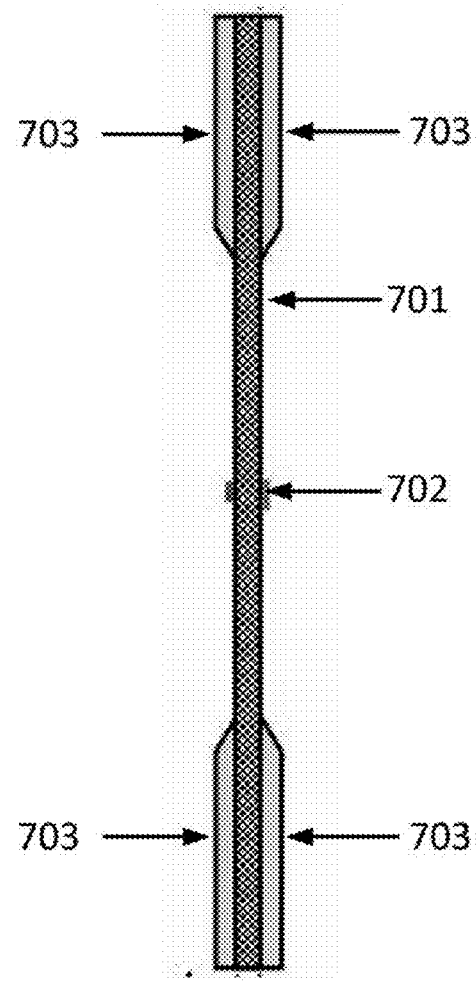
FIG. 7B is a schematic of an alternative view of a test specimen of stacked composite material for tension tests.
Figure 7C:
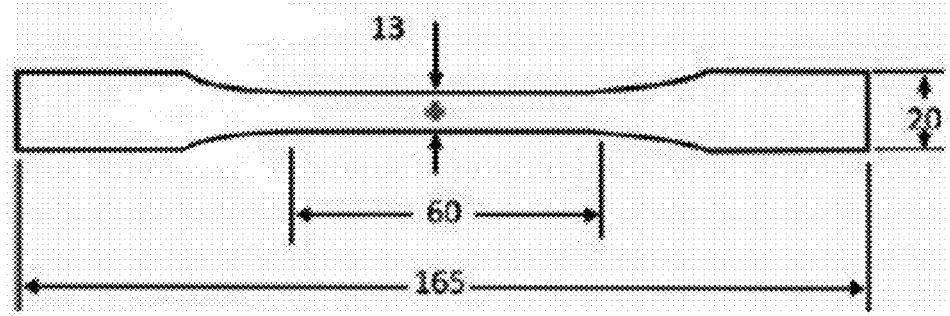
FIG. 7C is a schematic of a view of a test specimen of stacked composite material for tension tests with dimensions in millimeters.

The test specimens 701 of the stacked composite material were prepared and tested in accordance with ASTM standard D3039. The test specimens 701 were cut into strips with dimensions of 250 mm×25 mm (FIG. 7A, FIG. 7B, and FIG. 7C). Four rectangular aluminum end tabs 703 were bonded to the griping length (65 mm) of each test specimen 701 using a cold-hardening epoxy resin. These end tabs 703 not only reduce the stress concentration from the serrated grips but also prevent the slipping of the test specimen 701 from the grip, where the serration of the grip indented the aluminum tabs 703 and engaged it with the specimen 701. End tabs 703 also smoothly transfer the lateral compressive load owing the grips of the testing machine to the specimen 701 and prevent the crushing of the test specimens 701 between the grips. Strain gauges 702 were affixed to the center of the test specimens 701.

Calculation the Elastic Properties

Figure 8B:
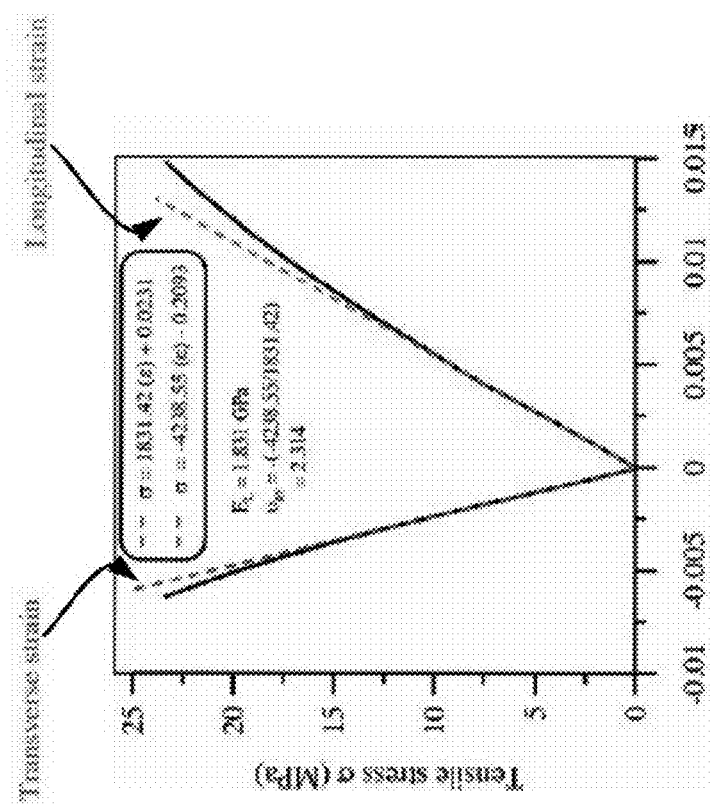
FIG. 8B is a diagram of the tensile stress measurement in transverse strain and longitudinal strain of a sample of a stacked composite material.
Figure 8A:
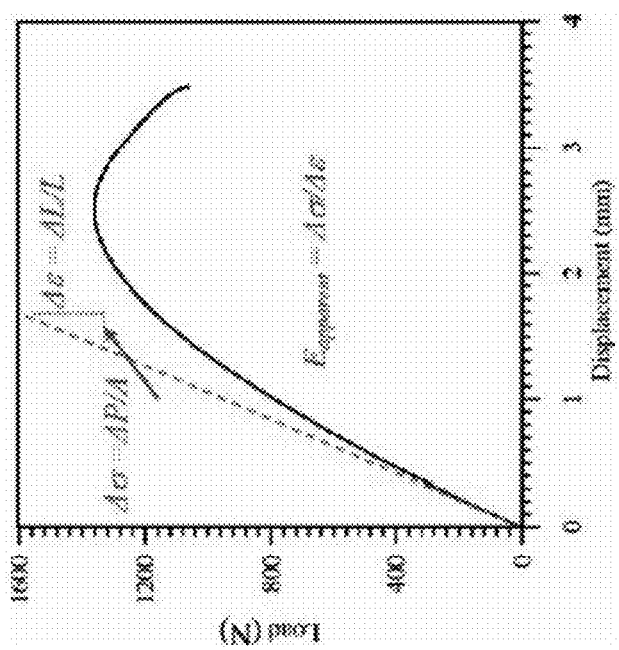
FIG. 8A is a diagram of the load v. displacement of a sample of a stacked composite material.

The apparent modulus was determined from the stress-strain curve of the testing machine as shown in FIG. 8. The actual strains in the longitudinal and transverse directions were measured using strain gauges 702 connected to 4-channel data acquisition model 9237 NI, which was connected to the computer. Accordingly, two perpendicular strain gages 702 were bonded to the specimen 701 back-to-back to measure the actual Young's modulus, $E_{xx}$, and the major Poisson's ratio $v_{xy}$. At least two specimens for each material type were prepared.

FIG. 8B shows the actual stress-strain diagram of neat epoxy as example. From this figure the actual tensile modulus and the major Poisson's ratio ($v_{xy}=\varepsilon_y/\varepsilon_x$) were calculated from the slope of the tangential line to the initial linear portion of the stress-strain diagrams. Previous studies showed that the tensile modulus of cross-ply composite laminate is more than six times the apparent modulus. The result in the previous studies was detected by the testing machine, Compression Tests The stacked composite material test specimens 901 were cut and prepared in accordance with ASTM standard D 3410 as shown in FIG. 9. The Wyoming Modified Celanese Compression Test Fixture was used for this purpose. The fixture presents a design improvement relative to the now withdrawn ASTM Standard D 3410 Celanese Compression Test Fixture. Four rectangular aluminum end tabs 903 were bonded to the griping length (50 mm) of each test specimen 901 using a cold-hardening epoxy resin. These end tabs 903 eliminate stress concentration owing to the serration of the grips and support the specimen 901 over its length to prevent buckling effects. Engagement of the serrations of the grips with the aluminum tabs 903 prevents slipping between them. End-tabs 903 also smoothly transfer the lateral compressive load owing the grips of the test fixture to the specimen 901 and accordingly, preventing the crushing of the test specimens 901 between the grips. The strain gauge 902 was affixed to the center of the test specimen. The apparent as well as the actual compressive moduli were measured in tension test. The actual compressive moduli of the investigated materials were measured using 9237 NI acquisition that was connected with the strain gage 902 and the computer.

Results

The following subsections show the experimental and finite element results regarding the tensile and the compression tests.

Tension

Figure 10B:
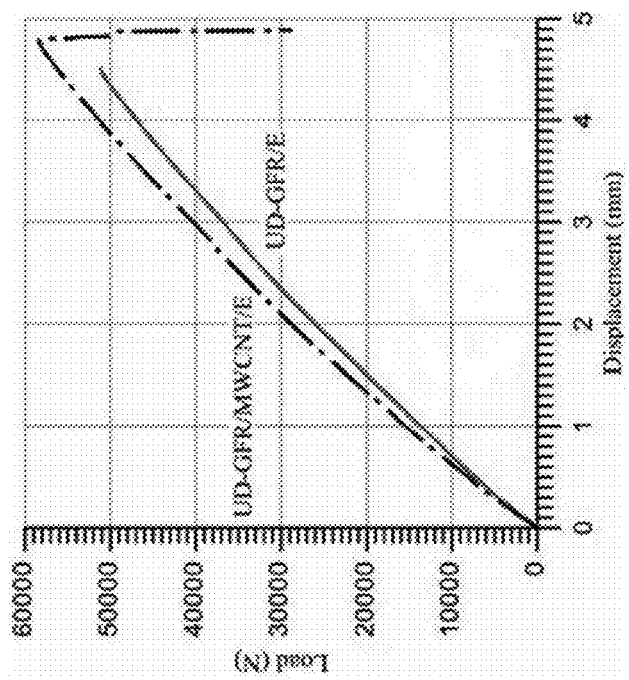
FIG. 10B is a graph of tensile load displacement diagrams of a unidirectional stacked composite material.
Figure 10A:
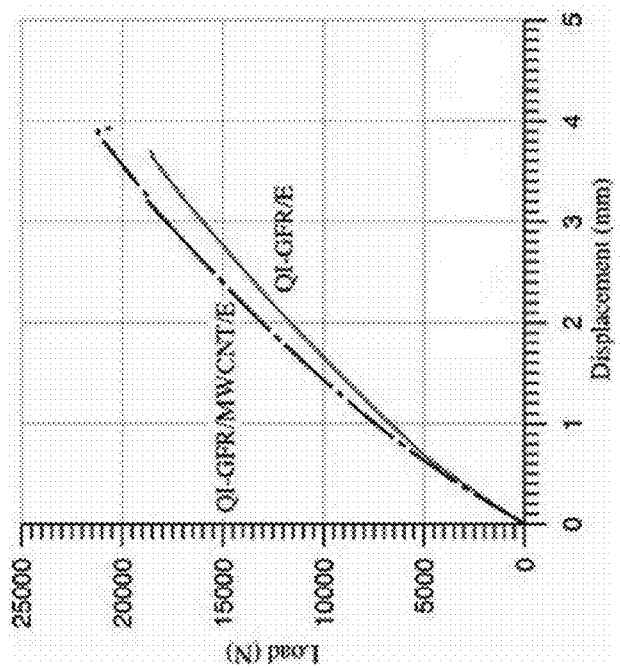
FIG. 10A is a graph of tensile load displacement measurement of a quasi-isotropic stacked composite material.

FIG. 10A is a graph of the load displacement of quasi-isotropic glass fiber reinforced stacked composite material (QI-GFR/MWCNT/E) in tension tests. It is observed form the curve that the ultimate tensile load increased by approx. 17% (from 1850 N to 2150 N). The modulus of elasticity also increased due to the slope increase of the QI-GFR/MWCNT/E curve compared to the QI-GFR/E (not using the nanocomposite layer with the MWCNT). FIG. 10B is a graph of the load displacement of unidirectional glass fiber reinforced stacked composite material (UD-GFR/MWCNT/E) in tension tests. The curve indicates that the ultimate tensile load increased by approx. 18% (from 5050 N to 5950 N). The modulus of elasticity also increased due to the slop increase of the UD-GFR/MWCNT/E curve compared to the UD-GFR/E (not using the nanocomposite layer with the MWCNT).

Figures 11A, 11B:
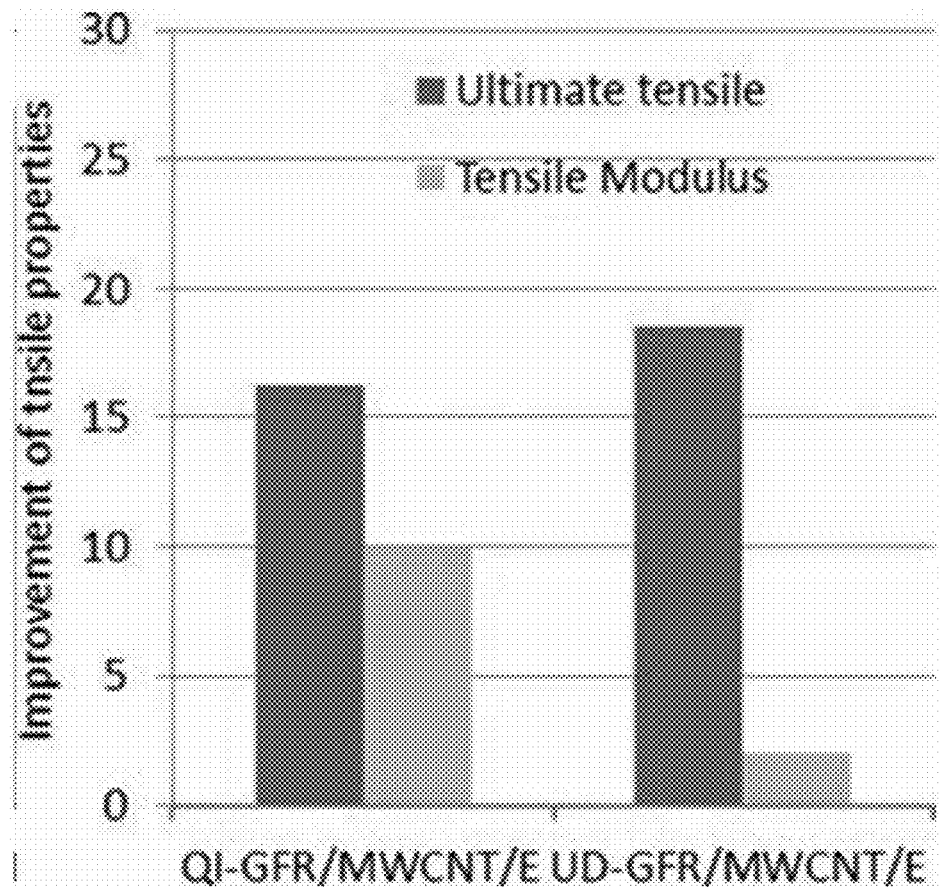
FIG. 11A is a graph of measured improvement in the tensile properties of stacked composite material.
FIG. 11B is a table of tensile properties of stacked composite materials.

FIG. 11A is a graph of the improvements in the tensile properties of the stacked composite material. The maximum tensile strength for quasi-isotropic glass fiber reinforced stacked composite material and the unidirectional glass fiber reinforced stacked composite material were improved by 16.2% and 18.5% compared to QI-GFR/E and UDGFR/E, respectively.

From FIG. 11B, it can be drawn that the maximum tensile strength for the unidirectional glass fiber reinforced stacked composite material is higher than those obtained from quasi-isotropic glass fiber reinforced stacked composite material.

Compression

Figure 12B:
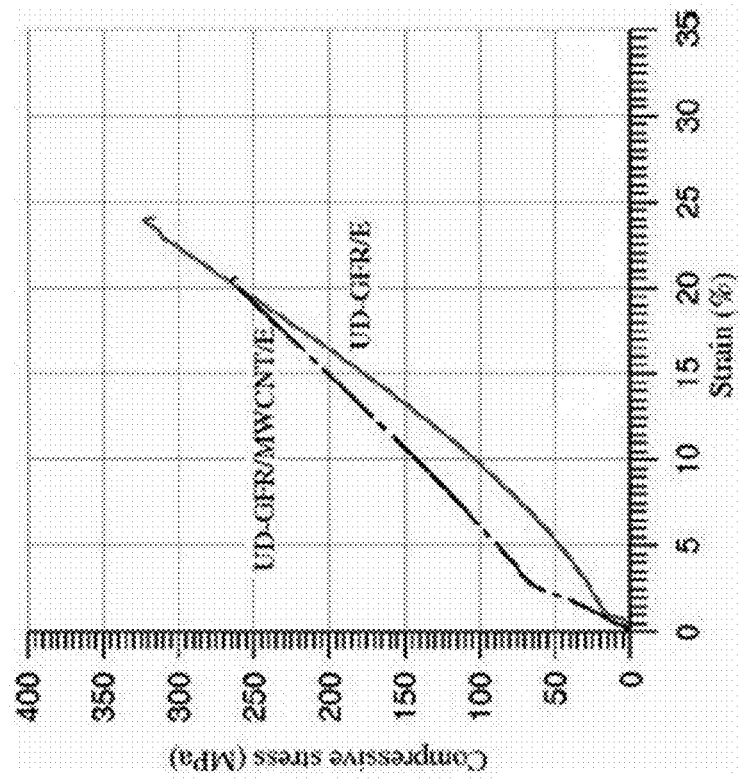
FIG. 12B is a graph of compression stress-strain measurements of unidirectional stacked composite material.
Figure 12A:
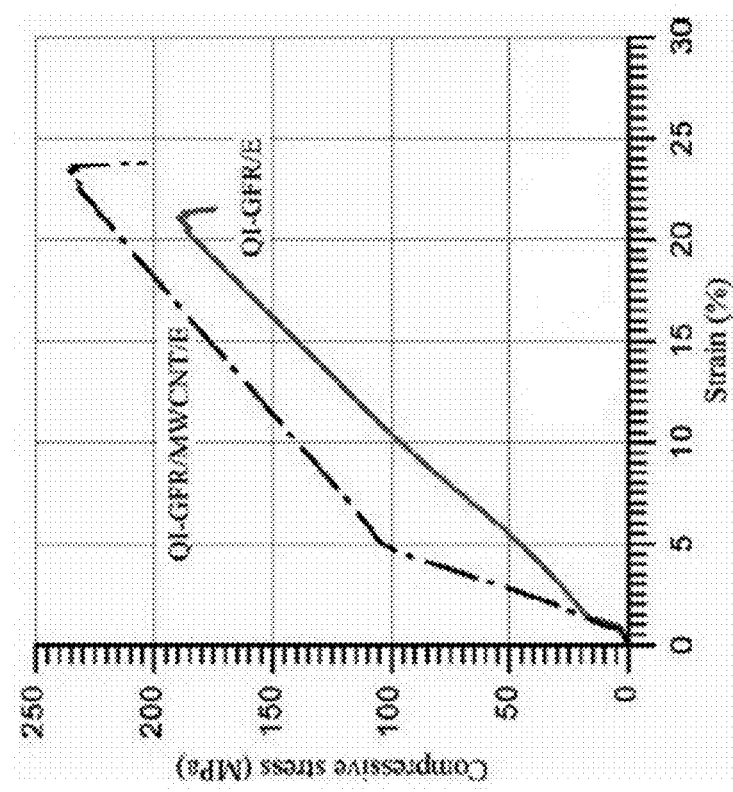
FIG. 12A is a graph of compression stress-strain measurements of quasi-isotropic stacked composite material.

The FIG. 12A and FIG. 12B are graphs of the stress-strain diagrams of quasi-isotropic glass fiber reinforced stacked composite material in compression tests and stress strain diagrams of unidirectional glass fiber reinforced stacked composite material in compression tests, respectively.

It can be observed from these figures, that the compressive strength was increased by 26% for QI-GFR/MWCNT/E compared to the QI GFR/E. However, the compressive strength decreased by 25% for UD GFR/MCNT/E compared to UD-GFR/E. It is also observed from FIG. 12A and FIG. 12B, that the modulus of elasticity was increased due to the increase of the slope for the QI-GFR/MWCNT/E and UD-GFR/MWCNT/E curve compared to the QI-GFR/E and UD-GFR/E.

Figures 13A, 13B:
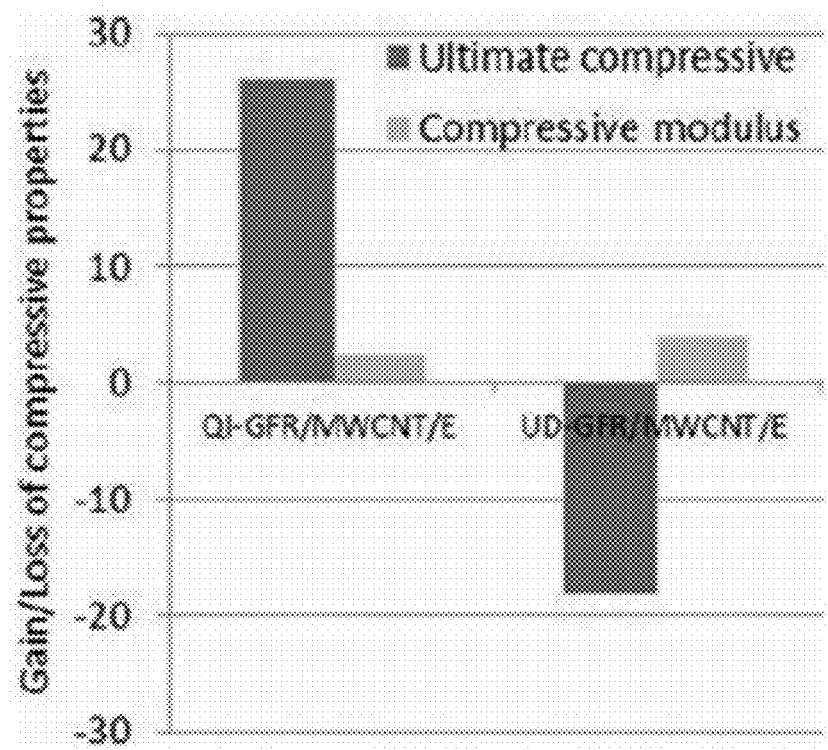
FIG. 13A is a graph of measured improvement in the compressive properties of stacked composite material.
FIG. 13B is a table of tensile properties of stacked composite materials.

FIG. 13A represents the improvements in the compressive properties of MWCNT nanocomposites/laminates. From the table in FIG. 13B, the maximum compressive strength for the UD-GFR/MWCNT/E is higher than those obtained for MWCNT/E and QI-GFR/MWCNT/E.

Figures 14A, 14B:
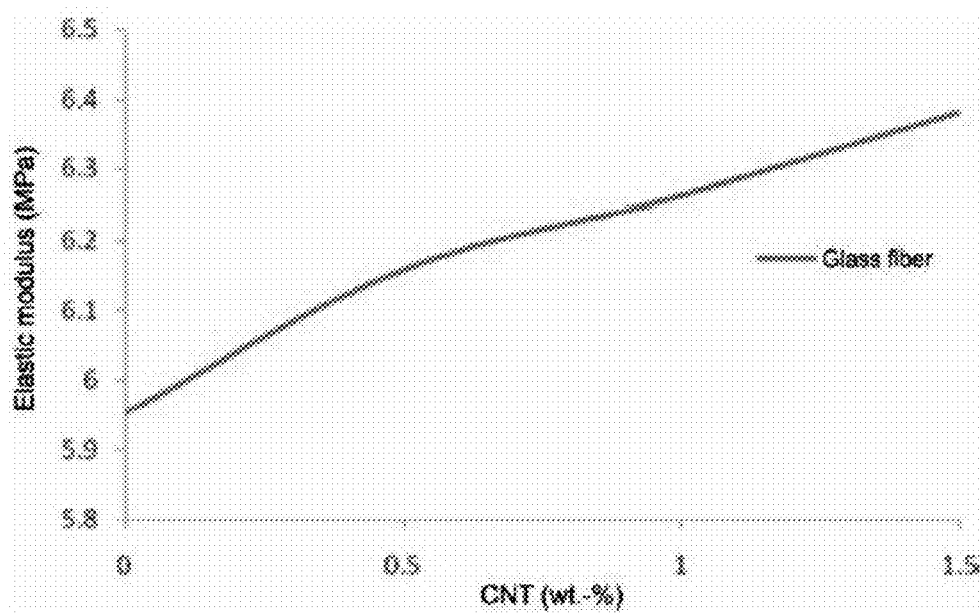
FIG. 14A is a graph of a change in elastic modulus at different amounts of MWCNT in wt %.
FIG. 14B is a table of percentage increase in the elastic modulus at different amounts of MWCNT wt %.

FIG. 14A is a graph of the elastic modulus of the glass fiber stacked composite material with different amounts of MWCNT in wt.-%, while the table in FIG. 14B shows the percentage increase in the elastic modulus.

The present disclosure shows modification of epoxy resin (Araldite PY 1092-1) by dispersion of MWCNT into an epoxy matrix using high intensity ultrasonic liquid processor. All the sonication parameters are quantitatively well defined. The multi-walled carbon nanotube was used to fabricate nanocomposite material as well as glass fiber reinforced stacked composite material. Four different advanced materials were fabricated including one quasi-isotropic stacked composite material (QI-GFR/MWCNT/E), one unidirectional stacked composite material (UD-GFR/MWCNT/E) and two stacked composite material manufactured without MWCNT (QI-GFR/E, UD-GFR/E). The stacked composite materials were fabricated using the modified hand lay-up technique. The following conclusions can be drawn:

1. Rolling of the composite laminates using the aluminum roller contributes in removing any visible air bubbles, providing fast impregnation and good wetting of glass fibers with the nanocomposite layer. Accordingly, this improves the fiber/matrix interfacial bond strength. In addition, applying rolling with moderate pressure played an important role in de-agglomeration of the alumina nanoparticles owing to the attractive forces between the MWCNT themselves and the van der Waals attractive interactions.

2. The results showed that the tensile and compressive parameters (strength and modulus) have been improved, as compared to only epoxy. The results of the finite element analyses were in good agreement with the experimental data.

3. The stacked composite material with MWCNT showed high improvements in their mechanical properties compared to the stacked composite material without MWCNT.

The invention claimed is:

1. A stacked composite material comprising:
   at least two glass fiber layers and
   at least three nanocomposite layers each comprising an epoxy matrix and carbon nanotubes, wherein said nanocomposite layers do not contain visible air bubbles and each comprise 0.75 to 1.5 wt % deagglomerated and randomly dispersed multiwalled carbon nanotubes relative to the weight of the epoxy matrix,
   wherein the glass fibers present in each glass fiber layer are surrounded with an epoxy matrix comprising carbon nanotubes;
   wherein each glass fiber layer is sandwiched between two nanocomposite layers and wherein a distance separating any two adjacent glass fiber layers of the stacked composite material ranges from 0.5 to 10 mm;
   wherein the glass fibers present in each glass fiber layer are unidirectionally oriented, and the glass fiber layers are oriented so as to enhance the quasi isotropic properties of the composite material; and
   wherein the stacked composite material has a glass fiber volume fraction ranging from 20% to 45% of a total volume of the stacked composite material.

2. The stacked composite material of claim 1, which has a wt % of the multi-wall carbon nanotubes ranging from 1.0 to 1.5 wt % relative to the total weight of the epoxy matrix.

3. The stacked composite material of claim 1, wherein a distance separating any two adjacent glass fiber layers of the stacked composite material ranges from 2 mm to 5 mm.

4. The stacked composite material of claim 1, wherein a linear density of the glass fibers is between 0.10 g/m to 3.0 g/m.

5. The stacked composite material of claim 1, wherein the multi walled carbon nanotubes have an outer diameter between 0.5 nm and 15 nm and a length between 1 µm and 50 µm.

6. The stacked composite material of claim 1, wherein the epoxy matrix comprises 50%-90% by weight of at least one epoxy resin, relative to a total weight of the epoxy matrix, and 15%-45% by weight of at least one epoxy hardener relative to the total weight of the epoxy matrix, and wherein the epoxy matrix has a viscosity between 210 centipoise and 410 centipoise in a temperature between −5° C. and 15° C.

7. The stacked composite material of claim 6, wherein the at least one epoxy resin comprises bisphenol A and/or bisphenol F and the at least one epoxy hardener comprises at least one selected from the group consisting of a cycloaliphatic amine, an aliphatic amine, and a thiol.

8. The stacked composite material of claim 1, which has at least 17 total layers of the glass fiber layer and the nanocomposite layer, wherein the nanocomposite layer forms a first layer and a last layer of the stacked composite material.

9. The stacked composite material of claim 8, wherein adjacent and noncontiguous glass fiber layers are oriented in a quasi-isotropic orientation with respect to the unidirectional glass fibers present within each glass fiber layer, and wherein the glass fiber layers have an orientation angle sequence of approximately 0°, approximately 45°, approximately 135°, or approximately 90° within the stacked composite material.

10. The stacked composite material of claim 9, wherein the orientation angle sequence is a palindromic sequence organized by an orientation angle of each glass fiber layer.

11. The stacked composite material of claim 1, wherein a glass fiber volume fraction is between 25% and 40% of the total volume of the stacked composite material.

12. The stacked composite material of claim 1, which has a tensile strength between 25 mega pascals to 55 mega pascals and a tensile strain between 5 giga pascals to 25 giga pascals.

13. The stacked composite material of claim 1, which has a compressive strength between 180 mega pascals to 300 mega pascals and compressive strain between 12 giga pascals to 15 giga pascals.

14. The stacked composite material of claim 1 that is prepared by
applying a nanocomposite layer comprising multi walled carbon nanotubes randomly dispersed in an epoxy matrix onto a substrate;
overlaying a glass fiber layer on top of the nanocomposite layer, wherein the glass fiber layer comprises glass fibers which are unidirectional;
rolling a roller over the glass fiber layer in a direction parallel to a longitudinal axis of the glass fibers thus impregnating and wetting the glass fibers with the carbon nanotubes randomly dispersed into an epoxy matrix;
repeating the applying, overlaying, and rolling,
wherein each glass fiber layer is sandwiched between two nanocomposite layers and each glass fiber layer is oriented in a unidirectional orientation or a quasi-isotropic orientation relative to an adjacent and non-contiguous glass fiber layer; and
applying and covering with a plate and curing to form the stacked composite material.

15. The stacked composite material of claim 14 that comprises at least 17 total layers of the glass fiber layer and the nanocomposite layer stacked concentrically in an alternating sequence and the nanocomposite layer forms a first layer and a last layer of the stacked composite material.

16. The stacked composite material of claim 15, wherein adjacent and noncontiguous glass fiber layers are oriented in a quasi-isotropic orientation with respect to the unidirectional glass fibers present within each glass fiber layer, and wherein the glass fiber layers have an orientation angle sequence of approximately 0°, approximately 45°, approximately 135°, or approximately 90° within the stacked composite material.

17. The stacked composite material of claim 16, wherein the orientation angle sequence is a palindromic sequence organized by an orientation angle of each glass fiber layer.

18. The stacked composite material of claim 1, wherein the curing comprises applying pressure to the plate for 8 hours to 60 hours then releasing the pressure and holding for 1 day to 35 days under ambient temperature.

19. The stacked composite material of claim 18, wherein the pressure applied to the plate is between 50 kgf/m$^2$ and 300 kgf/m$^2$ and the pressure is applied uniformly to the plate.

20. The stacked composite material of claim 1,
that has a higher elastic modulus, higher ultimate tensile load, and higher compressive strength than an otherwise identical stacked composite material not containing the dispersed carbon nanotubes.

* * * * *